(12) United States Patent
Mikuriya et al.

(10) Patent No.: US 11,265,969 B2
(45) Date of Patent: Mar. 1, 2022

(54) MANAGEMENT DEVICE, TERMINAL DEVICE, AND NON-TRANSITORY STORAGE MEDIUM

(71) Applicant: JVCKENWOOD Corporation, Yokohama (JP)

(72) Inventors: Junichi Mikuriya, Yokohama (JP); Ichiro Shishido, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 157 days.

(21) Appl. No.: 16/819,228

(22) Filed: Mar. 16, 2020

(65) Prior Publication Data

US 2020/0314964 A1    Oct. 1, 2020

(30) Foreign Application Priority Data

Mar. 25, 2019    (JP) .............................. JP2019-057470

(51) Int. Cl.
*H04W 4/08*    (2009.01)
*H04W 88/06*    (2009.01)
*H04W 88/18*    (2009.01)

(52) U.S. Cl.
CPC ........... *H04W 88/181* (2013.01); *H04W 4/08* (2013.01); *H04W 88/06* (2013.01)

(58) Field of Classification Search
None
See application file for complete search history.

(56) References Cited

FOREIGN PATENT DOCUMENTS

JP    2008-005169    1/2008

*Primary Examiner* — James P Duffy
(74) *Attorney, Agent, or Firm* — Amin, Turocy & Watson, LLP

(57) ABSTRACT

A management device including an acquirer configured to acquire response information indicating whether a call-destination terminal has accepted participation in group communication, and terminal operation information indicating whether the call-destination terminal is in a state capable of receiving the group communication, a processor configured to create communication result information including participation information on the call-destination terminal whether to participate in the group communication, and a transmitter configured to transmit the communication result information, wherein, in a case of non-participation where the call-destination terminal has not participated in the group communication, the processor is configured to create the participation information that makes it possible to identify at least two factors of the non-participation.

10 Claims, 12 Drawing Sheets

| BASE STATION ID | TERMINAL DEVICE ID | RESPONSE RESULT | RESPONSE AVERAGE TIME (SECOND) | PARTICIPATION RATE [%] |
|---|---|---|---|---|
| #C | #20c-1 | PARTICIPATION ACCEPTED | 10 | 100 |
| #C | #20c-2 | PARTICIPATION ACCEPTED | 3 | 80 |
| #C | #20c-3 | PARTICIPATION REFUSED | 5 | 50 |
| #C | #20c-4 | NO RESPONSE | 14 | 20 |
| #C | #20c-5 | POWER OFF | - | 0 |

FIG.6

| BASE STATION ID | TERMINAL DEVICE ID | PARTICIPATION INFORMATION |
|---|---|---|
| #A | #20a-2 | PARTICIPATION ACCEPTED |
| #A | #20a-4 | POWER OFF |
| #B | #20b-1 | RESOURCE SHORTAGE |
| #B | #20b-2 | RESOURCE SHORTAGE |
| #B | #20b-3 | RESOURCE SHORTAGE |
| #C | #20c-1 | PARTICIPATION REFUSED |
| #C | #20c-2 | NO RESPONSE |
| #C | #20c-3 | NO RESPONSE |
| #C | #20c-4 | PARTICIPATION ACCEPTED |
| #D | #20d-1 | NETWORK FAULT |
| #D | #20d-2 | NETWORK FAULT |
| #D | #20d-3 | NETWORK FAULT |

FIG.9

| TERMINAL DEVICE ID | USER ID | GROUP ID | BASE STATION ID | REGISTRATION STATE |
|---|---|---|---|---|
| #20a-1 | #U1 | #1 | #A | REGISTERED |
| #20a-2 | #U2 | #1 | #A | REGISTERED |
| #20a-3 | #U3 | #1000 | #A | REGISTERED |
| #20a-4 | #U4 | #1 | #A | UNREGISTERED |
| #20b-1 | #U5 | #1 | #B | REGISTERED |
| #20b-2 | #U6 | #1 | #B | REGISTERED |
| #20b-3 | #U7 | #1 | #B | REGISTERED |
| #20c-1 | #U8 | #1 | #C | REGISTERED |
| #20c-2 | #U9 | #1 | #C | REGISTERED |
| #20c-3 | #U10 | #1 | #C | REGISTERED |
| #20d-1 | #U11 | #1 | #D | REGISTERED |
| #20d-2 | #U12 | #1 | #D | REGISTERED |
| #20d-3 | #U13 | #1 | #D | REGISTERED |

1) DISPLAY FOR DESIGNATING NUMBER OF PARTICIPANTS

PLEASE DESIGNATE NUMBER OF PARTICIPANTS IN GROUP AND WAITING TIME.

NUMBER OF PARTICIPANTS: 4

WAITING TIME (SECOND): 15

2) DISPLAY FOR DESIGNATING PARTICIPATION RATE

PLEASE DESIGNATE PARTICIPATION RATE IN GROUP AND WAITING TIME.

PARTICIPATION RATE (%): 80

WAITING TIME (SECOND): 20

630     620

US 11,265,969 B2

MANAGEMENT DEVICE, TERMINAL DEVICE, AND NON-TRANSITORY STORAGE MEDIUM

CROSS-REFERENCE TO RELATED APPLICATIONS

This application claims priority from Japanese Application No. 2019-057470, filed on Mar. 25, 2019, the contents of which are incorporated by reference herein in its entirety.

FIELD

The present invention relates to a management device, a terminal device, and a non-transitory storage medium.

BACKGROUND

In a radio communication system, voice communication or the like is performed through a radio base station device located in a wide area, within a group including a plurality of mobile stations.

For example, Japanese Laid-open Patent Publication No. 2008-5169 describes a technique for displaying information on a mobile station that could not answer a calling because of the presence outside the service range of a network and/or a mobile station that moved out of the service range during group communication, onto mobile stations in the group. Further, Japanese Laid-open Patent Publication No. 2008-5169 describes a technique for a mobile station to participate halfway in (rejoin) group communication when the mobile station returns into the service range from outside the range. Further, Japanese Laid-open Patent Publication No. 2008-5169 also describes a technique for allowing a mobile station to participate halfway in group communication while reflecting the intention of a user who is participating in the group communication, by displaying information on a mobile station that did not answer and/or information on a mobile station that was present outside the service range, on the display part of the call-origination side.

Japanese Laid-open Patent Publication No. 2008-5169 only considers that a mobile station is present outside the service range, as a factor of preventing participation of the mobile station in group communication. However, there is a case where a mobile station cannot participate in group communication, even if the mobile station is present within the service range. For this reason, it is desired to provide detailed information regarding the communication status of group communication, such as the participation status of a call-destination terminal serving as a calling object in the group communication.

The present invention provides a management device, a terminal device, and a non-transitory storage medium that can provide detailed information on the communication status of group communication.

SUMMARY

It is an object of the present invention to at least partially solve the problems in the conventional technology.

According to one aspect, there is provided a management device including an acquirer configured to acquire response information indicating whether a call-destination terminal has accepted participation in group communication, and terminal operation information indicating whether the call-destination terminal is in a state capable of receiving the group communication, a processor configured to create communication result information including participation information on the call-destination terminal whether to participate in the group communication, on a basis of the response information and the terminal operation information acquired by the acquirer, and a transmitter configured to transmit the communication result information, wherein, in a case of non-participation where the call-destination terminal has not participated in the group communication, the processor is configured to create the participation information that makes it possible to identify at least two factors of the non-participation, one factor resulting from that the acquirer has acquired the response information indicating the non-participation in the group communication from the call-destination terminal, another factor resulting from that the acquirer did not acquire a response result from the call-destination terminal within a predetermined time.

According to one aspect, there is provided a terminal device including a transmitter configured to transmit a start request for group communication that designates a call-destination terminal, a receiver configured to receive communication result information including terminal device identification information that makes it possible to identify the call-destination terminal and participation information on the call-destination terminal whether to participate in the group communication in accordance with the start request, and a processor configured to create a diagram illustrating at least whether the call-destination terminal has participated in the group communication, on a basis of the communication result information received by the receiver, and a display configured to display the diagram, wherein, in a case of non-participation where the call-destination terminal has not participated in the group communication, the participation information makes it possible to identify at least two factors of the non-participation, one factor resulting from that the participation in the group communication was refused by the call-destination terminal, another factor resulting from that a response result was not returned from the call-destination terminal within a predetermined time, and wherein the processor is configured to cause the display to display the diagram illustrating the terminal device identification information of the call-destination terminal that has not participated in the group communication for each factor in a different display mode.

According to one aspect, there is provided a non-transitory computer-readable recording medium that stores a program that causes a computer to execute a process including transmitting a start request for group communication designating a call-destination terminal, receiving communication result information including terminal device identification information that makes it possible to identify the call-destination terminal in response to the start request and participation information on the call-destination terminal device whether to participate in the group communication, based on the communication result information received in the receiving process, creating a diagram illustrating at least whether the call-destination terminal has participated in the group communication, and displaying the diagram, wherein, in a case of non-participation where the call-destination terminal has not participated in the group communication, the participation information makes it possible to identify at least two factors of the non-participation, one factor resulting from that the participation in the group communication was refused by the call-destination terminal, another factor resulting from that a response result was not be returned from the call-destination terminal within a predetermined time, and wherein the diagram illustrating the terminal device identification information of the call-destination terminal that has not participated in the group communication is displayed for each factor in a different display mode.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of the data structure of a participation information database;

FIG. 9 is a diagram illustrating an example of the data structure of a terminal device database;

FIG. 12A is a diagram for explaining an example of a method of setting the number of members in a group;

FIG. 12B is a diagram for explaining an example of a method of setting the participation rate;

DETAILED DESCRIPTION OF THE PREFERRED EMBODIMENTS

An embodiment according to the present invention will be explained below in detail with reference to the accompanying drawings. The present invention is not limited to the following embodiment. Further, where there are a plurality of embodiments, the present invention also encompasses those configured by combining the embodiments.

Before a specific explanation on the present invention, an explanation will first be given of an outline of a business-use radio system. An embodiment of the present invention relates to a business-use radio system that includes a plurality of base station devices connected to a network, a plurality of terminal devices, and a system management device connected to the network.

In the field of land mobile radio systems (LMR: Land Mobile Radio) that are mainly used for business purposes, there are a plurality of system forms, which are roughly categorized into two systems of a trunking system and a conventional system. For the sake of brevity of description, the present embodiment will be described by taking the trunking system as an example. However, the present invention is not limited to the trunking system, but can be applied to the conventional system. Further, the present invention is not limited to a business-use radio system, but can be applied to other communication systems, such as a communication system using a mobile phone network.

In the trunking system, in order to share a radio channel and thereby use the frequency efficiently, a communication channel is assigned to mobile stations every time communication rises up by using the line control device of a base station device, so that the system enables communication to be performed between the mobile stations through the base station device located in each place. In the case of a business-use radio system, a group is formed of a plurality of mobile stations.

Radio Communication System

Figure 1:
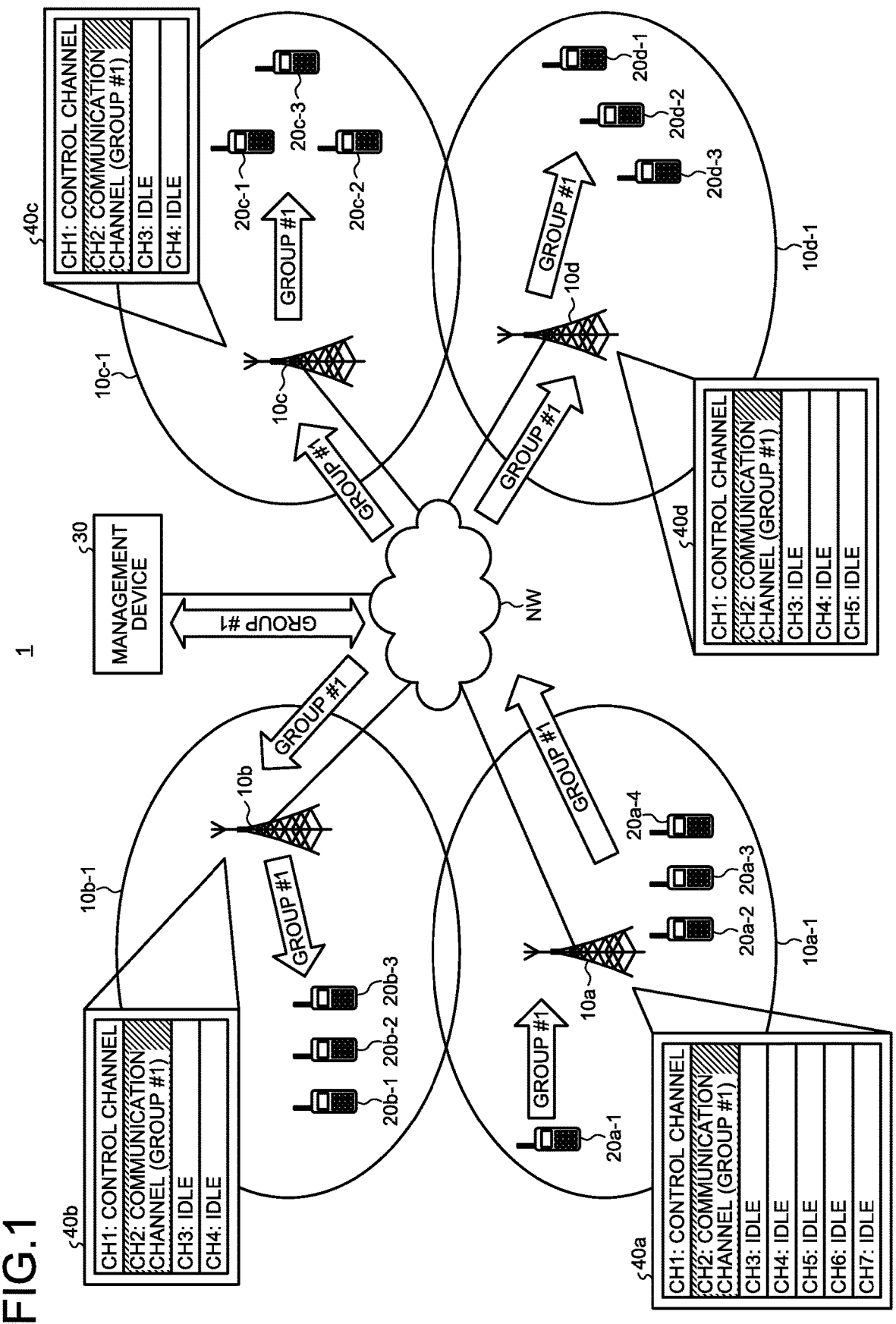
FIG. 1 is a schematic diagram illustrating the configuration of a radio communication system according to an embodiment of the present invention.

With reference to FIG. 1, an explanation will be given of the configuration of a radio communication system 1 according to the present invention. FIG. 1 is a schematic diagram illustrating the configuration of the radio communication system 1 according to the present invention. The radio communication system 1 illustrated in FIG. 1 is a business-use radio system, for example.

The radio communication system 1 includes a base station device 10a, a base station device 10b, a base station device 10c, a base station device 10d, a terminal device 20a-1, a terminal device 20a-2, a terminal device 20a-3, a terminal device 20a-4, a terminal device 20b-1, a terminal device 20b-2, a terminal device 20b-3, a terminal device 20c-1, a terminal device 20c-2, a terminal device 20c-3, a terminal device 20d-1, a terminal device 20d-2, a terminal device 20d-3, and a management device 30. The radio communication system 1 illustrated in FIG. 1 is a mere example, and is not intended to limit the number of base station devices nor the number of terminal devices. Further, in the following description, when the base station device 10a, the base station device 10b, the base station device 10c, and the base station device 10d do not need distinction mutually, each of these devices may also be referred to as "base station device 10" used as a general term. When the terminal device 20a-1, the terminal device 20a-2, the terminal device 20a-3, the terminal device 20a-4, the terminal device 20b-1, the terminal device 20b-2, the terminal device 20b-3, the terminal device 20c-1, the terminal device 20c-2, the terminal device 20c-3, the terminal device 20d-1, the terminal device 20d-2, and the terminal device 20d-3 do not need distinction mutually, each of these devices may also be referred to as "terminal device 20" used as a general term. The base station devices 10 are connected to the management device 30 through a network NW.

The base station device 10a forms a communication area 10a-1. The base station device 10a performs radio communication with the terminals present in the communication area 10a-1. In the example illustrated in FIG. 1, the base station device 10a performs radio communication with the terminal device 20a-1, the terminal device 20a-2, the terminal device 20a-3, and the terminal device 20a-4. The communication area 10a-1 may be referred to as "area A". The base station device 10a is set with a plurality of channels CH1 to CH7, as illustrated in channel information 40a. The CH1 is a control channel. The CH2 to CH7 are channels used for communication channels. The communication channel means a channel for transmitting data, such as audio, image, video, and text, exchanged between terminal devices 20. In the example illustrated in FIG. 1, the CH2 is a communication channel dynamically assigned for group communication whose group ID is "group #1". In the example illustrated in FIG. 1, the CH3 to CH7 are in an idle state. Each channel in an idle state is to be used as a communication channel when group communication is performed for a group different from the group "group #1" to which the CH2 is assigned.

The base station device 10b forms a communication area 10b-1. The base station device 10b performs radio communication with the terminals present in the communication area 10b-1. In the example illustrated in FIG. 1, the base station device 10b performs radio communication with the terminal device 20b-1, the terminal device 20b-2, and the terminal device 20b-3. The communication area 10b-1 may be referred to as "area B". The base station device 10b is set with a plurality of channels CH1 to CH4, as illustrated in channel information 40b. The CH1 is a control channel. The CH2 to CH4 are channels used for communication channels. In the example illustrated in FIG. 1, the CH2 is a communication channel dynamically assigned for the group communication whose group ID is "group #1". In the example illustrated in FIG. 1, the CH3 and CH4 are in an idle state.

The base station device 10c forms a communication area 10c-1. The base station device 10c performs radio communication with the terminals present in the communication area 10c-1. In the example illustrated in FIG. 1, the base station device 10c performs radio communication with the terminal device 20c-1, the terminal device 20c-2, and the terminal device 20c-3. The communication area 10c-1 may be referred to as "area C". The base station device 10c is set with a plurality of channels CH1 to CH4, as illustrated in channel information 40c. The CH1 is a control channel. The CH2 to CH4 are channels used for communication channels. In the example illustrated in FIG. 1, the CH2 is a communication channel dynamically assigned for the group communication whose group ID is "group #1". In the example illustrated in FIG. 1, the CH3 and CH4 are in an idle state.

The base station device 10d forms a communication area 10d-1. The base station device 10d performs radio communication with the terminals present in the communication area 10d-1. In the example illustrated in FIG. 1, the base station device 10d performs radio communication with the terminal device 20d-1, the terminal device 20d-2, and the terminal device 20d-3. The communication area 10d-1 may be referred to as "area D". The base station device 10d is set with a plurality of channels CH1 to CH5, as illustrated in channel information 40d. The CH1 is a control channel. The CH2 to CH5 are channels used for communication channels. In the example illustrated in FIG. 1, the CH2 is a communication channel dynamically assigned for the group communication whose group ID is "group #1". In the example illustrated in FIG. 1, the CH3 and CH5 are in an idle state.

Each terminal device 20 is a radio terminal that can communicate with the other terminal devices through the base station devices 10. When the power is turned on or when the reception electric field intensity during standby decreases, the terminal device 20 searches the control channels to select a base station device with the best line quality, and requests location registration and group registration to the base station device thus selected.

Hereinafter, an explanation will be given of an outline of the location registration (location registration process) and the group registration (group registration process).

The location registration is a process of registering information on a terminal device 20 and information on a base station device 10 to be used by the terminal device 20 from now, into the management device 30. Specifically, first, the terminal device 20 transmits a location registration request to the base station device 10 to be used from now. Upon reception of the location registration request, the base station device 10 registers information including identification information on the base station device 10 and identification information on the terminal device 20, into the management device 30. By the location registration, the management device 30 can grasp the area where the terminal device 20 is present (the base station device 10 that can communicate with the terminal device 20). Consequently, the management device 30 can specify the base station device 10 to be used when communication with the terminal device 20 rises up. For example, when the terminal device 20a-1 sends a call (or originates a call) toward the terminal device 20b-1, the base station device 10a receives radio waves, and relays the radio waves to the base station device 10b. In such a process, the terminal device 20b-1 performs registration into the management device through the base station device 10b, so that the management device 30 can specify that the base station device 10b is a base station device to be used when communication related to the terminal device 20b-1 rises up. Hereinafter, a terminal device 20 that sends a call (or originates a call) for communication will be referred to as "sender terminal" or "call-origination terminal". Further, a terminal device 20 that is designated as a communication partner by a call-origination terminal, i.e., a terminal device 20 serving as a called object, will be referred to as "call-destination terminal". In the case of one-to-one individual communication, the management device 30 can immediately transmit a signal for announcing an incoming call to the base station device 10 in the area where the call-destination terminal is present. As the location registration for a terminal device 20 is performed, it is possible to save the trouble of searching for the terminal device 20, and thereby operate the radio communication system 1 efficiently.

The group registration is a process of registering a group to be used for group communication by a terminal device 20, into the management device 30. By the group registration, the management device 30 can grasp the base station device 10 in the area where each call-destination terminal belonging to the group designated by a call-origination terminal is present. Accordingly, the management device 30 can easily specify the area where each terminal device 20 belonging to the group designated by the call-origination terminal is present, and thereby perform group communication efficiently. Here, even after the group registration is performed, the user can change the group to which a terminal device 20 belongs by performing a predetermined operation.

Each terminal device 20 deletes its own location information stored in the management device 30 by sending notice of deletion of the location registration to the base station device 10, when the power is turned off. The management device 30 centrally manages the location information on the terminal devices 20. Accordingly, the management device 30 can grasp the terminal devices 20 present in each of the areas. The management device 30 can also grasp the area where each terminal device 20 (call-destination terminal) serving as a group calling object is present, by performing the group registration for the terminal device 20. Accordingly, the management device 30 can perform group calling efficiently, by using the registered areas as a calling range.

Here, an explanation will be given of an outline of a process of starting group communication.

When call-origination for starting group communication rises up in a terminal device 20, the terminal device 20 transmits a group communication request to the base station device 10 through the control channel. Upon reception of the group communication request, the base station device 10 secures resources for performing the group communication. For example, a typical resource is a channel, and the base station device 10 assigns a channel for the group communication. The base station device 10 requests the management device 30 for the group communication. Upon reception of the request, the management device 30 confirms whether there is registration of base station device areas for this group. When there is registration, the management device 30 requests each of the other base station devices to assign a channel to this group, through the network. Each of the other base station devices secures resources for the group communication, in response to the request.

Each of the base station device 10 serving as a sending source and the other base station devices transmits a request including communication channel information to terminal devices 20 through the control channel. Each terminal device 20 belonging to this group recognizes the communication channel by receiving a request including the communication channel information through the control channel. The call-origination terminal transmits a signal through the assigned communication channel to the base station device 10. This signal contains a digitized audio signal. The base station 10 that has received the signal from the call-origination terminal transmits the received signal to the terminal devices 20 belonging to this group through the assigned communication channel. Further, the base station device 10 transmits the received signal to the management device 30. The management device 30 distributes the received signal to other base station devices. Each of the other base station devices transmits the signal to terminal devices 20 (call-destination terminals) through the assigned communication channel. Each of the terminal devices 20 (call-destination terminal) decodes the audio signal based on the received signal, and outputs audio from a speaker.

As described above, a plurality of groups each including a plurality of terminal devices are formed. Further, each of the plurality of base station devices assigns a channel to each group. As a result, communication is performed from one terminal device included in a group to which the channels are assigned, to the other terminal devices included in this group.

Such group communication uses one channel of each base station device when group communication rises up by one time. Accordingly, in a case where terminal devices belonging to the same group are registered in the plurality of base station devices, the number of channels used for group communication of one time is corresponding to the number of these base station devices in the entire system. The above process is performed for each group.

With reference to FIG. 1, a specific explanation will be given. FIG. 1 illustrates an operation of each base station device in a case where group communication of the "group #1" is performed. However, substantially the same operation can be applied to a case where group communication of another group is performed. In the following description with reference to FIG. 1, it is assumed that the terminal device 20a-1 present in the communication area 10a-1 is a call-origination terminal.

The terminal device 20a-1 transmits a signal for requesting communication by using the control channel CH1 of the base station device 10a. This signal will also be referred to as "call-origination request", "communication request", "group communication request", or "group communication start request". In the management device 30, each terminal device belonging to the "group #1" and area information thereon are registered in association with each other. Accordingly, the management device 30 judges the area information on each terminal device belonging to the "group #1", and transmits a channel assignment request for the "group #1" to the base station device 10b, the base station device 10c, and the base station device 10d. Each terminal device present in the communication area of each base station device receives signals by using a communication channel of the base station device. In the example illustrated in FIG. 1, the communication channel CH2 of each of the base station device 10b, the base station device 10c, and the base station device 10d is used for signal reception.

Figure 2:
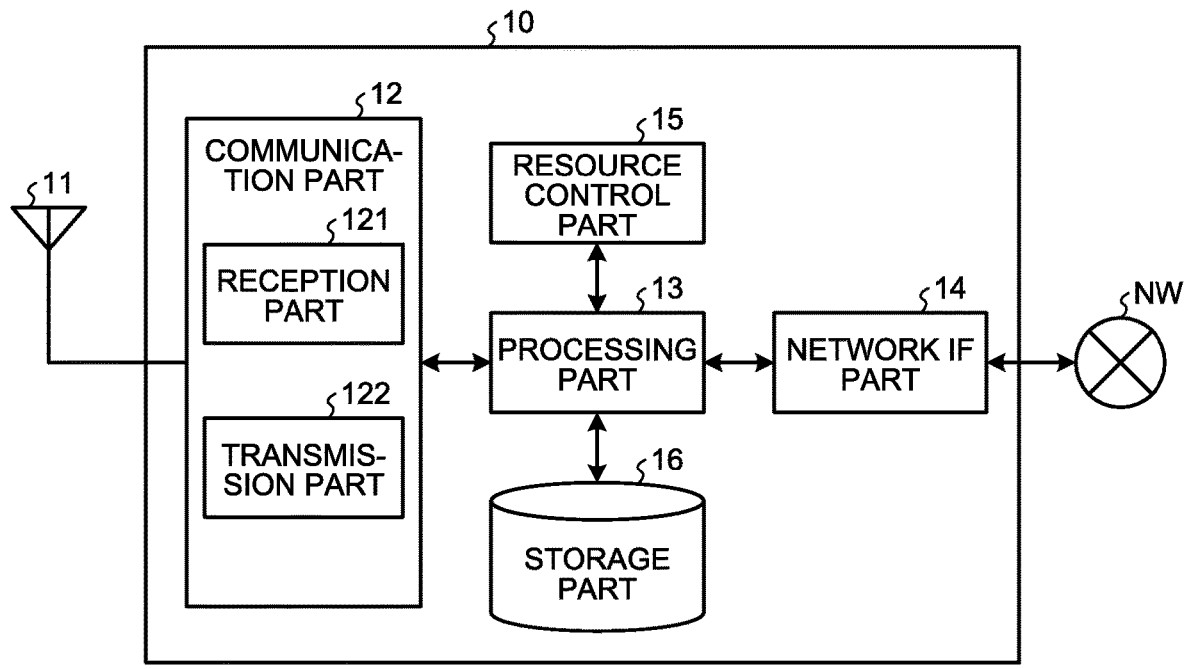
FIG. 2 is a block diagram illustrating an example of the configuration of a base station device according to this embodiment of the present invention.

With reference to FIG. 2, an explanation will be given of the configuration of each base station device 10 according to this embodiment of the present invention. FIG. 2 is a block diagram illustrating an example of the configuration of the base station device 10.

The base station device 10 includes an antenna 11, a communication part 12, a processing part (also referred to a processor) 13, a network IF (Interface) part 14, a resource control part 15, and a storage part 16.

The communication part 12 performs information communication with the terminal devices 20. The communication part 12 includes a reception part (also referred to a receiver) 121 and a transmission part (also referred to a transmitter) 122.

The reception part 121 receives uplink signals from each terminal device 20 through the antenna 11. The uplink signals to be received by the reception part 121 include various kinds of information transmitted from each terminal device 20, such as an audio signal, location registration information, and a group communication request, from the terminal device 20. The reception part 121 outputs the uplink signals received from each terminal device 20 to the processing part.

The transmission part 122 transmits downlink signals to each terminal device 20 through the antenna 11. The downlink signals to be transmitted by the transmission part 122 include information input from the processing part 13, such as an audio signal and a group communication request.

The processing part 13 processes various signals. When the reception part 121 receives a location registration request, the processing part 13 outputs this location registration request to the storage part 16. The storage part 16 stores unit information and awaited group information, concerning each terminal device. Further, the processing part 13 outputs the location registration request to the network IF part 14. The network IF part 14 transmits the location registration request to the management device 30 through the network NW. As described later, the location registration request to be transmitted from the base station device 10 to the management device 30 includes a terminal device ID (terminal device identification information) for identifying the terminal device 20, a user ID (user identification information) for identifying the user who uses the terminal device 20, a group ID (group identification information) for identifying the group to which the terminal device 20 belongs, and a base station ID (base station identification information) for identifying the base station device 10 that has received the location registration request from the terminal device 20 (radio waves from the terminal device 20).

When the reception part 121 receives a group communication request, the processing part 13 outputs this group communication request to the resource control part 15. The resource control part 15 manages resources necessary for communication. A typical resource is a channel to be used for radio communication. Further, other than the channel, those called resources include the processing capacity and/or the amount of power to be used, in a CPU (Central Processing Unit), a memory, and so forth necessary for executing a communication process in the base station device 10. The resource control part 15 monitors channel assignment management for group communication, availability of the CPU and the memory, power consumption, and so forth. The resource control part 15 outputs communication channel information to the processing part 13 when the resources are secured. The processing part 13 outputs the communication channel information to the transmission part 122. The transmission part 122 sends notice of the communication channel information to the call-origination terminal device 20.

When the reception part 121 receives an audio signal, the processing part 13 outputs this audio signal to the network IF part 14. The network IF part 14 transmits the audio signal to the management device 30 through the network NW.

Upon reception of information including information on a response result and a response time from a terminal device, the processing part 13 outputs this information to the network IF part 14. The network IF part 14 transmits information including the information on the response result and the response time to the management device through the network NW. The response time and the response result will be described later.

The network IF part 14 receives a channel assignment request for group communication that has risen up at another base station device, from the management device 30. The network IF part 14 outputs the channel assignment request to the processing part 13. The processing part 13 outputs the channel assignment request for the group communication to the resource control part 15. The resource control part 15 secures resources on the basis of the channel assignment request. Upon success in securing resources, the resource control part 15 outputs communication channel information to the processing part 13. The processing part 13 outputs the received communication channel information to the transmission part 122. Further, the processing part 13 outputs a resource securing response (success) to the network IF part 14. On the other hand, upon failure in securing resources, the resource control part 15 outputs a resource securing response (failure) to the processing part 13. The processing part 13 outputs the received resource securing response (failure) to the network IF part 14. The resource securing response will be described later. As a typical resource is a channel, the resource securing response will also be referred to as "channel securing response". As the resource securing response is information that indicates the operation status of the base station device 10, the resource securing response will also be referred to as "operation information on base station device" or "base station operation information". Hereinafter, the "resource securing response (success)" or "channel securing response (success)" may be referred to as "success response", and the "resource securing response (failure)" or "channel securing response (failure)" may be referred to as "failure response".

The network IF part 14 transmits the resource securing response to the management device 30. Upon reception of an audio signal from the management device 30, the network IF part 14 outputs this audio signal to the processing part 13. The processing part 13 outputs the audio signal to the transmission part 122. The transmission part 122 transmits the audio signal received from the processing part 13 to each terminal device 20 through the antenna 11.

Figure 3:
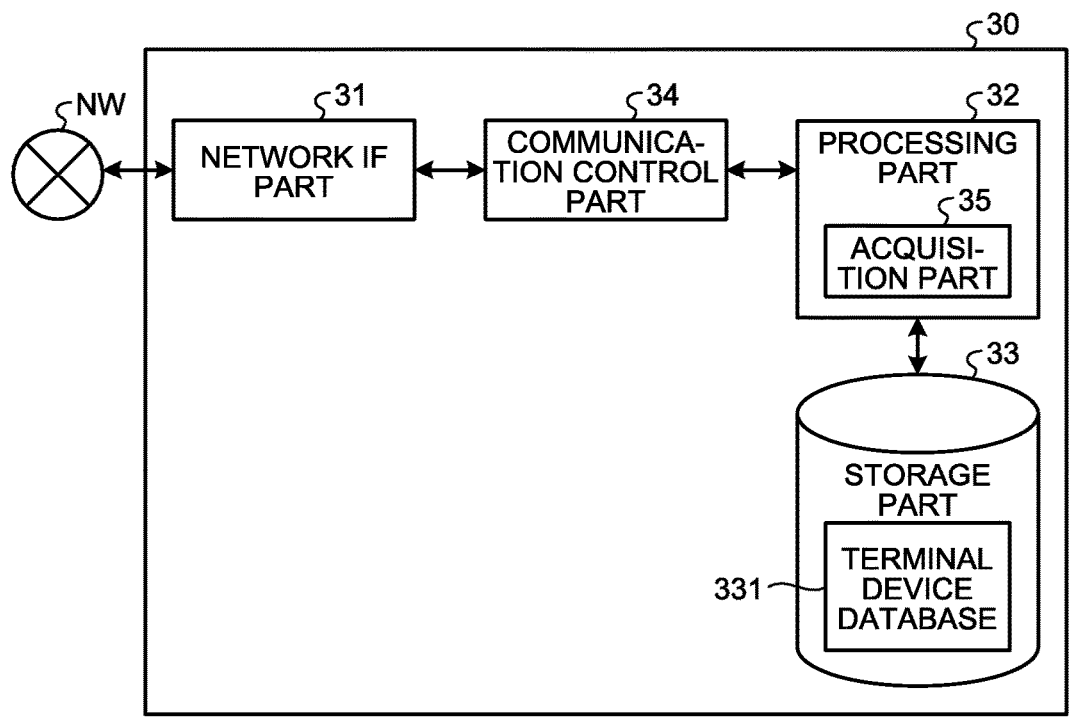
FIG. 3 is a block diagram illustrating an example of the configuration of a management device according to this embodiment of the present invention.

With reference to FIG. 3, an explanation will be given of the configuration of the management device 30 according to this embodiment of the present invention. FIG. 3 is a block diagram illustrating an example of the configuration of the management device 30 according to this embodiment of the present invention.

The management device 30 includes a network IF part 31, a processing part (also referred to a processor) 32, storage part 33, and a communication control part (also referred to a communication controller) 34. The processing part 32 includes an acquisition part (also referred to an acquirer) 35.

The network IF part 31 receives a call-origination request, an audio signal, an end notice, a report notice on terminal device participation status, a resource securing result response, and so forth from each base station device 10 through the network NW, and outputs them to the processing part 32. The network IF part 31 receives information including information on a response result and a response time from each base station device 10 through the network NW.

Upon reception of a call-origination request, the processing part 32 searches the storage part 33, and, on the basis of a group name (group ID) included in the call-origination request, acquires the base station device ID of each area having registration of the group. Then, the processing part 32 transmits information on "group participation request" to each base station device 10 having registration of the group, through the network NW. Hereinafter, the "group participation request" may also be referred to as "participation request". The processing part 32 collects, from each base station device 10 related to the group communication, all information indicating, e.g., whether a terminal device calling process has been executed in accordance with the "group participation request", and creates (generates) group participation information. Then, the network IF part 31 transmits the created group participation information to the call-origination terminal device 20 through the network NW. The group participation information will also be referred to as "communication result information". The acquisition part 35 is included in the processing part 32, and thus the acquisition part 35 can be said to be part of the processing part 32. As described later, the acquisition part 35 acquires data necessary for the processing part 32 to create the group participation information, from each base station device 10 through the network IF part 31, or the storage part 33. As described above, the network IF part 31 also serves as a receiver and a transmitter.

The processing part 32 calculates the average value of response times from the past response times. The processing part 32 stores information on the response average time, in association with the response result, into a terminal device database (a first terminal database) 331 illustrated in FIG. 4. Here, for a terminal device 20 that has never returned a participation response so far, the processing part 32 stores "-", "NULL", or the like indicating that the response average time cannot be calculated, in the terminal device database 331.

The storage part 33 stores various kinds of data. For example, the storage part 33 stores the terminal device database 331. The terminal device database 331 includes various kinds of information on terminal devices registered in each base station device.

Figures 4, 5:
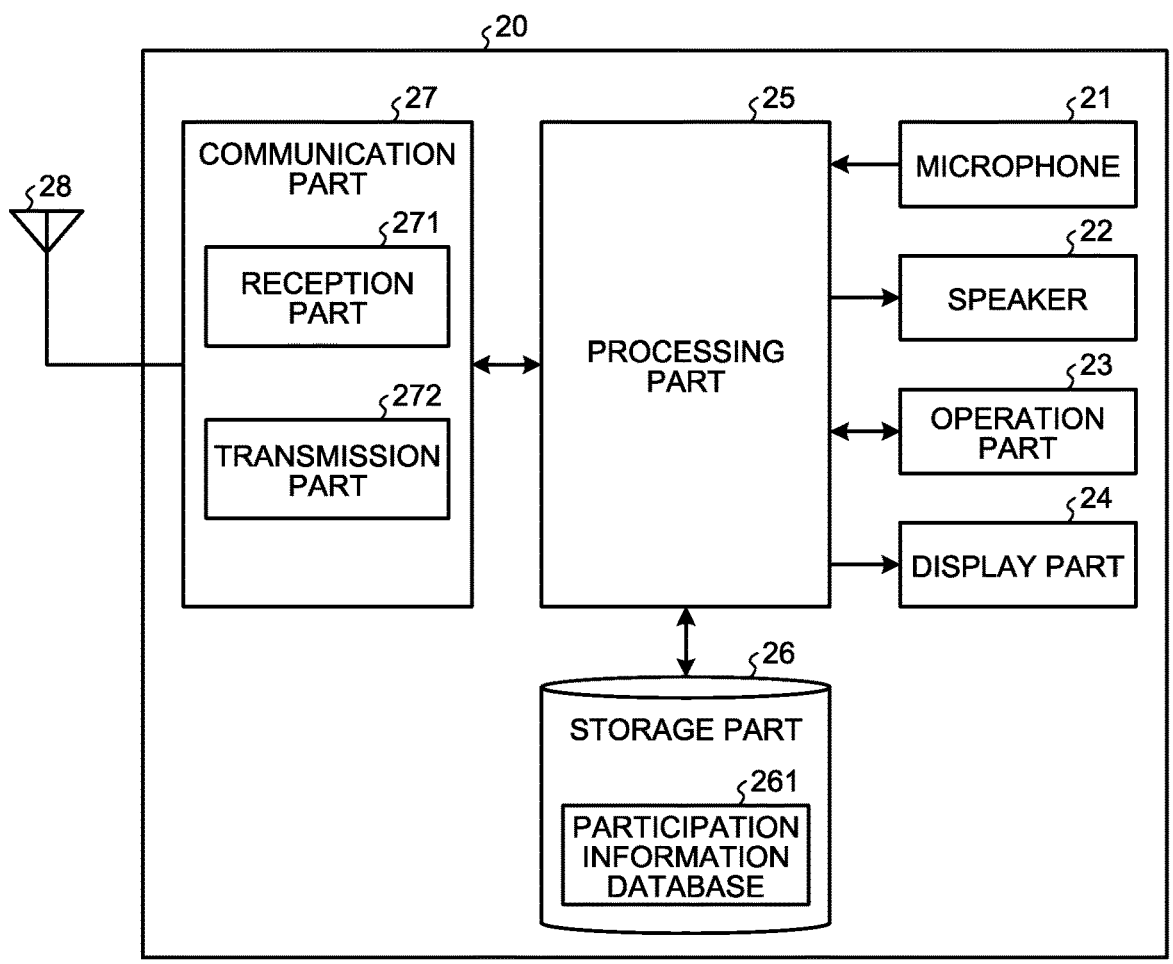
FIG. 4 is a diagram illustrating an example of the data structure of a terminal device database.
FIG. 5 is a block diagram illustrating an example of the configuration of a terminal device according to this embodiment of the present invention.

With reference to FIG. 4, an explanation will be given of the terminal device database 331. FIG. 4 is a diagram illustrating an example of the data structure of the terminal device database 331.

As illustrated in FIG. 4, in the terminal device database 331, "base station ID", "terminal device ID", "response result", "response average time", and "participation rate" are associated with each other.

The "base station ID" is identification information for identifying the base station to which an associated terminal device is connected. Hereinafter, "#A" means the base station device 10a, "#B" means the base station device 10b, "#C" means the base station device 10c, and "#D" means the base station device 10d. For the sake of brevity of description, in the example illustrated in FIG. 4, only the base station ID "#C" is illustrated. Accordingly, FIG. 4 shows information concerning the terminal devices belonging to the base station device 10c.

The "terminal device ID" is terminal device identification information for uniquely identifying a terminal device. As illustrated in FIG. 4, five terminal devices of "#20c-1", "#20c-2", "#20c-3", "#20c-4", and "#20c-5" belong to the base station device 10c whose base station ID is "#C". The terminal device with a "terminal device ID" of "#20c-1" is the terminal device 20c-1. The terminal device with a "terminal device ID" of "#20c-2" is the terminal device 20c-2. The terminal device with a "terminal device ID" of "#20c-3" is the terminal device 20c-3. The terminal device with a "terminal device ID" of "#20c-4" is the terminal device 20c-4. The terminal device with a "terminal device ID" of "#20c-5" is the terminal device 20c-5.

The "response result" indicates a response of a terminal device 20 to the group participation request. In the example illustrated in FIG. 4, "participation accepted", "participation refused", "no response", and "power off" are shown as the "response result". The "participation accepted" means that participation in the group communication has been accepted. The "participation refused" means that participation in the group communication has been explicitly refused by the user's operation. The "no response" means that there was no participation response transmitted within a predetermined time, for example, because the user was outside the communication service range or the user did not notice the incoming call for the group communication. The "power off" means that the power of the terminal device 20 was in an off-state and thus participation in the group communication was not possible.

The "response average time" is the average value of response times of the terminal device 20 to a group participation request. The response time is the time in the terminal device 20 from reception of a group participation request to return of a response result. In other words, the response time is the time in the base station device 10 from transmission of a group participation request to the terminal device 20 to reception of a response result from the terminal device 20. In FIG. 4, the response average time is given in "second". For example, it is shown at the terminal device 20c-1 that the average time from reception of a group participation request to return of a response thereto is "10 seconds". For example, it is shown at the terminal device 20c-5 that there was no response after reception of a group participation request. In FIG. 4, the response average time is calculated with respect to responses made after the terminal device 20 is registered in a specific base station device 10. For example, in the example illustrated in FIG. 4, after the terminal device 20c-1 is registered in the base station device 10c, the average value of response times for the terminal device 20c-1 to return a response to the base station device 10c is calculated as "10 seconds". However, regardless of which base station device 10 the terminal device 20 is registered in, the average value may be calculated for all the past response times, or for response times in a predetermined period (for example, the last one month), concerning the terminal device 20. For example, in the example illustrated in FIG. 4, the response average time may be calculated by using response times obtained in the past when there was registration of the terminal device 20c-1 in a base station device 10 other than the base station device 10c. In this case, it suffices that all the past response times are stored for each terminal device 20 in the storage part 33 of the management device 30.

The "participation rate" is a rate at which the terminal device 20 made a response of "participation accepted" in a group participation request in the past. For example, it is shown at the terminal device 20c-1 that the participation rate in group communication is "100%". As in the response average time, the participation rate may be calculated with respect to responses made after the terminal device 20 is registered in a specific base station device 10 (the base station device 10c in this case). Alternatively, regardless of which base station device 10 the terminal device 20 is registered in, the participation rate may be calculated on the basis of all the past responses or responses in a past predetermined period, concerning the terminal device 20.

The communication control part 34 decides a waiting time (timer waiting time) for a response result to a group participation request. Specifically, the communication control part 34 performs this decision by using either one of the five methods described below. However, the methods described below do not limit the method for the communication control unit 34 to decide the response waiting time.

First Method

In the first method, from the response average time of each terminal device serving as a calling object (call-destination terminal), the communication control part 34 calculates the average value (reference time) of the response average times of all the terminal devices serving as calling objects, and decides the waiting time on the basis of this average value. For example, the communication control part 34 sets the average value itself as the waiting time. For example, as in the example illustrated in FIG. 4, where the response average times of four terminal devices are "10 seconds", "3 seconds", "5 seconds", and "14 seconds", the communication control part 34 calculates the average value of these values. In this case, the communication control part 34 calculates "(10+3+5+14)/4=8 seconds", and sets "8 seconds" as the waiting time. Here, the communication control part 34 does not use a terminal device for which the response average time has not been calculated, such as the terminal device ID "#20c-5" in FIG. 4, for calculating the average value (reference time).

The communication control part 34 may set, as the waiting time, a value obtained by multiplying the reference time by a predetermined coefficient (for example, "1.5") or a value obtained by adding a predetermined value (for example, "5 seconds") to the reference time. For example, where the reference time is "8 seconds", it suffices that the communication control part 34 calculates "8×1.5=12 seconds", "8+5=13 seconds", or the like. In this case, the communication control part 34 sets "12 seconds", "13 seconds", or the like as the waiting time.

Second Method

In the second method, the communication control part 34 decides the waiting time on the basis of the response average time (reference time) of a terminal device having the longest response average time among the terminal devices. For example, the communication control part 34 may set the reference time itself as the waiting time. Specifically, where the response average times of four terminal devices are "10 seconds", "3 seconds", "5 seconds", and "14 seconds", the communication control part 34 sets "14 seconds", which is the longest response average time, as the waiting time.

The communication control part 34 may set, as the waiting time, a value obtained by multiplying the reference time by a predetermined coefficient (for example, "1.2") or a value obtained by adding a predetermined value (for example, "3 seconds") to the reference time. For example, where the reference time is "14 seconds", it suffices that the communication control part 34 calculates "14×1.2=16.8 seconds", "14+3=17 seconds", or the like.

Third Method

In the first method and the second method described above, the waiting time is decided by using information on all the terminal devices serving as calling objects. In the third method, the communication control part 34 decides the waiting time by using information on some of the terminal devices serving as calling objects.

Specifically, the communication control unit 34 uses a terminal device having a participation rate equal to or higher than a threshold value (predetermined value), as an object for calculating the waiting time. For example, as in the example illustrated in FIG. 4, where the participation rates of five terminal devices are "100%", "80%", "50%", "20%", and "0%", and the threshold value is set to "60%", two terminal devices having participation rates of "100%" and "80%" are used as objects for calculating the waiting time. Then, it suffices that the communication control part 34 uses the response average times of the two terminal devices having these high participation rates, and calculates the waiting time by using the first method or the second method. For example, where the response average times of the two terminal devices are "10 seconds" and "3 seconds", and the second method is used, the communication control part 34 sets "10 seconds", which is the longest one of them, as the waiting time.

Here, the communication control part 34 may select a predetermined number (one or more) of terminal devices in descending order of participation rate, and decide the waiting time by using information on only of the selected terminal devices. In this case, for example, the communication control part 34 may set the predetermined number as "1" and select a terminal device having the highest participation rate. Then, it suffices that the communication control part 34 uses the response average time of this terminal device, and calculates the waiting time by using the first method or the second method.

Fourth Method

In the fourth method, the communication control part 34 calculates the reference time of each terminal device in accordance with the participation rate of the terminal device, and calculates the waiting time on the basis of the reference time.

Specifically, first, the communication control part 34 decides a coefficient in accordance with the participation rate. For example, where the participation rate is higher than 80% and equal to or lower than 100%, the communication control part 34 sets the coefficient to "2". Where the participation rate is higher than 60% and equal to or lower than 80%, the communication control part 34 sets the coefficient to "1.5". Where the participation rate is higher than 30% and equal to or lower than 60%, the communication control part 34 sets the coefficient to "1". Where the participation rate is equal to or lower than 30%, the communication control part 34 sets the coefficient to "0.8". Thus, as the participation rate is higher, the coefficient is set to a higher value. Here, these values of the coefficient may be freely changed by the user.

The communication control part 34 calculates the reference time of each terminal device by multiplying its response average time by the coefficient. For example, where the participation rate of the terminal device 20c-1 is "100%" and the response average time is "10 seconds", as the coefficient is "2", the communication control part 34 calculates "10×2=20 seconds" as the reference time of the terminal device 20c-1. Further, where the participation rate of the terminal device 20c-2 is "80%" and the response average time is "3 seconds", as the coefficient is "1.5", the communication control part 34 calculates "3×1.5=4.5 seconds" as the reference time of the terminal device 20c-2. Further, where the participation rate of the terminal device 20c-3 is "50%" and the response average time is "5 seconds", as the coefficient is "1.0", the communication control part 34 calculates "5×1.0=5 seconds" as the reference time of the terminal device 20c-3.

Then, the communication control part 34 decides the waiting time on the basis of the reference time of each terminal device. For example, the longest reference time is set as the waiting time. For example, where the reference times of three terminal devices are "10 seconds", "4.5 seconds", and "5 seconds", the communication control part 34 sets the longest "10 seconds" as the waiting time. Alternatively, a value obtained by multiplying the longest reference time by a predetermined value or a value obtained by adding a predetermined value to the longest reference time may be set as the waiting time.

Fifth Method

In the first method to the fourth method described above, the waiting time is set to a single waiting time. However, the waiting time may be set for each terminal device.

Specifically, in the fifth method, the communication control part 34 calculates the reference time of each terminal device, as in the fourth method. Then, the communication control part 34 decides the waiting time for each terminal device on the basis of the reference time. For example, it is assumed that the reference time of the terminal device 20c-1 is "20 seconds", the reference time of the terminal device 20c-2 is "4.5 seconds", and the reference time of the terminal device 20c-3 is "5 seconds". In this case, the communication control part 34 sets the waiting time of the terminal device 20c-1 to "20 seconds", sets the waiting time of the terminal device 20c-2 to "4.5 seconds", and sets the waiting time of the terminal device 20c-3 to "5 seconds". Thus, instead of the same waiting time, different waiting times are used for respective terminal devices. In this case, the terminal device 20c-1 can be awaited for "20 seconds", but the terminal device 20c-2 can be awaited only for "4.5 seconds". The management device 30 needs to wait for the longest waiting time, which is "20 seconds" of the terminal device 20c-1 in this case. However, for example, even if the terminal device 20c-2 returns a response result of "participation accepted" after "10 seconds", the management device 30 regards the terminal device 20c-2 as having no response. By using such a method, it is possible to obtain an effect that the user of a call-destination terminal device comes to try to shorten the time for returning a participation response.

The communication control part 34 waits for just a period of the waiting time decided by using either one of the first method to the fifth method which is also referred to a predetermined time, and determines whether to start the group communication on the basis of the number of response results of "participation accepted" received during the period. For example, the communication control part 34 starts the group communication when a predetermined number (for example, three) or more response results (response information) of "participation accepted" are obtained, and cancels the group communication otherwise. Alternatively, the communication control part 34 starts the group communication when the rate of response results of "participation accepted" obtained is equal to or higher than a predetermined rate (for example, 70% of the terminal devices serving as calling objects), and cancels the group communication otherwise. Alternatively, the communication control part 34 may start the group communication when a specific terminal device (user) returns a response result of "participation accepted", and cancel the group communication otherwise. The number of specific terminal devices (users) may be one or may be two or more. For example, as a specific terminal device, a terminal device used by an important user in the group, such as a group responsible person or manager, may be designated.

With reference to FIG. 5, an explanation will be given of the configuration of each terminal device 20 according to this embodiment of the present invention. FIG. 5 is a block diagram illustrating an example of the configuration of the terminal device 20 according to this embodiment of the present invention.

The terminal device 20 includes a microphone 21, a speaker 22, an operation part 23, a display part (also referred to a display) 24, a processing part (also referred to a processor) 25, a storage part 26, a communication part 27, and an antenna 28. The communication part 27 includes a reception part (also referred to a receiver) 271 and a transmission part (also referred to a transmitter) 272.

In the case of communication, the microphone 21 receives voice from the user, and converts the voice into an audio signal. The microphone 21 outputs the audio signal to the processing part 25.

In the communication, the speaker 22 receives an audio signal from the processing part 25, and outputs the audio signal as voice. Here, the speaker 22 may output a warning sound or the like.

The operation part 23 includes a button, a touch panel, and so forth, and receives an input from the user. The operation part 23 outputs the received input to the processing part 25.

The display part 24 receives an image (also referred to a diagram or display data) and a message from the processing part 25, and displays them. Where a face of a display is formed of a touch panel, the display part 24 is integrated with the operation part 23. However, the display part 24 may be not included in the terminal device 20. For example, an external display unit (not illustrated) may be connected to the terminal device 20 to display information on the display unit thus connected.

When the power of the terminal device 20 is turned on or when the terminal device 20 enters a new area, the processing part 25 generates a location registration request and a group registration request, and causes transmission part 272 to transmit the location registration request and the group registration request.

The transmission part 272 transmits the location registration request and the group registration request to the base station device 10 through an uplink control channel, under the control of the processing part 25. After the transmission part 272 performs the transmission through the uplink control channel, the reception part 271 receives a response to the location registration request and a response to the group registration request through a downlink control channel from the base station device. Upon reception of a call-origination request from the base station device 10, the reception part 271 outputs this request to the processing part 25. On the basis of the call-origination request, the processing part 25 judges whether the group is corresponding to the request to be received. Upon reception of group participation information from the base station device 10, the reception part 271 outputs this information to processing part 25. The processing part 25 stores group participation information on each terminal device into the storage part 26. The storage part 26 stores the group participation information on each terminal device as a participation information database 261.

With reference to FIG. 6, an explanation will be given of the participation information database 261. FIG. 6 is a diagram illustrating an example of the data structure of the participation information database 261.

As illustrated in FIG. 6, in the participation information database 261, "base station ID", "terminal device ID", and "participation information" are associated with each other.

The "base station ID" is an ID for identifying the base station to which a terminal device that receives the group participation request belongs.

The "terminal device ID" is an ID for uniquely identifying a terminal device that receives the group participation request. A terminal device with a "terminal device ID" of "#20a-2" is the terminal device 20a-2. A terminal device with a "terminal device ID" of "#20a-4" is the terminal device 20a-4. A terminal device with a "terminal device ID" of "#20b-1" is the terminal device 20b-1. A terminal device with a "terminal device ID" of "#20b-2" is the terminal device 20b-2. A terminal device with a "terminal device ID" of "#20b-3" is the terminal device 20b-3. A terminal device with a "terminal device ID" of "#20d-1" is the terminal device 20d-1. A terminal device with a "terminal device ID" of "#20d-2" is the terminal device 20d-2. A terminal device with a "terminal device ID" of "#20d-3" is the terminal device 20d-3.

For example, the fields of "participation information" store information, such as "participation accepted", "power off", "resource shortage", "participation refused", "no response", and "network fault".

The "participation accepted" indicates that participation in the group communication has been accepted by a user of a terminal device. In the example illustrated in FIG. 6, it is shown at the terminal device 20a-1 and the terminal device 20c-4 that participation in the group communication has been accepted.

The "power off" indicates that the power of the terminal device 20 was in an off-state and thus participation in the group communication was not possible. In the example illustrated in FIG. 6, it is shown at the terminal device 20a-4 that the power was in an off-state.

The "resource shortage" indicates a state where the base station device 10 was in resource shortage and thus participation in the group communication was not possible. For example, this is a status where "the base station device 10 was short of communication channel", "the base station device 10 was short of processing capacity, such as that of the CPU or memory", "the base station device 10 exceeded the available power amount", or the like. In the example illustrated in FIG. 6, it is shown at the terminal device 20b-1, the terminal device 20b-2, and the terminal device 20b-3, that the base station device 10 was in resource shortage and thus participation in the group communication was not possible.

The "participation refused" indicates that participation in the group communication has been explicitly refused by the user of the terminal device 20 by the user's operation. In the example illustrated in FIG. 6, it is shown at the terminal device 20*c*-1 that participation in the group communication has been refused.

The "no response" indicates that there was no participation response transmitted within a predetermined time, for example, because the user was outside the communication service range or the user did not notice the incoming call for the group communication. In the example illustrated in FIG. 6, it is shown at the terminal device 20*c*-2 and the terminal device 20*c*-3, there was no response made.

The "network fault" indicates a state where the network between the management device 30 and the base station device 10 was in a disconnected state and thus participation in the group communication was not possible. In the example illustrated in FIG. 6, it is shown, at the terminal device 20*d*-1, the terminal device 20*d*-2, and the terminal device 20*d*-3, that there was a network fault between the base station device 10*d* and the management device 30 and thus participation in the group communication was not possible.

The processing part 25 reads the group participation information from the participation information database 261 of the storage part 26, and displays the information on the display part.

Process in Radio Communication System

Figure 7:
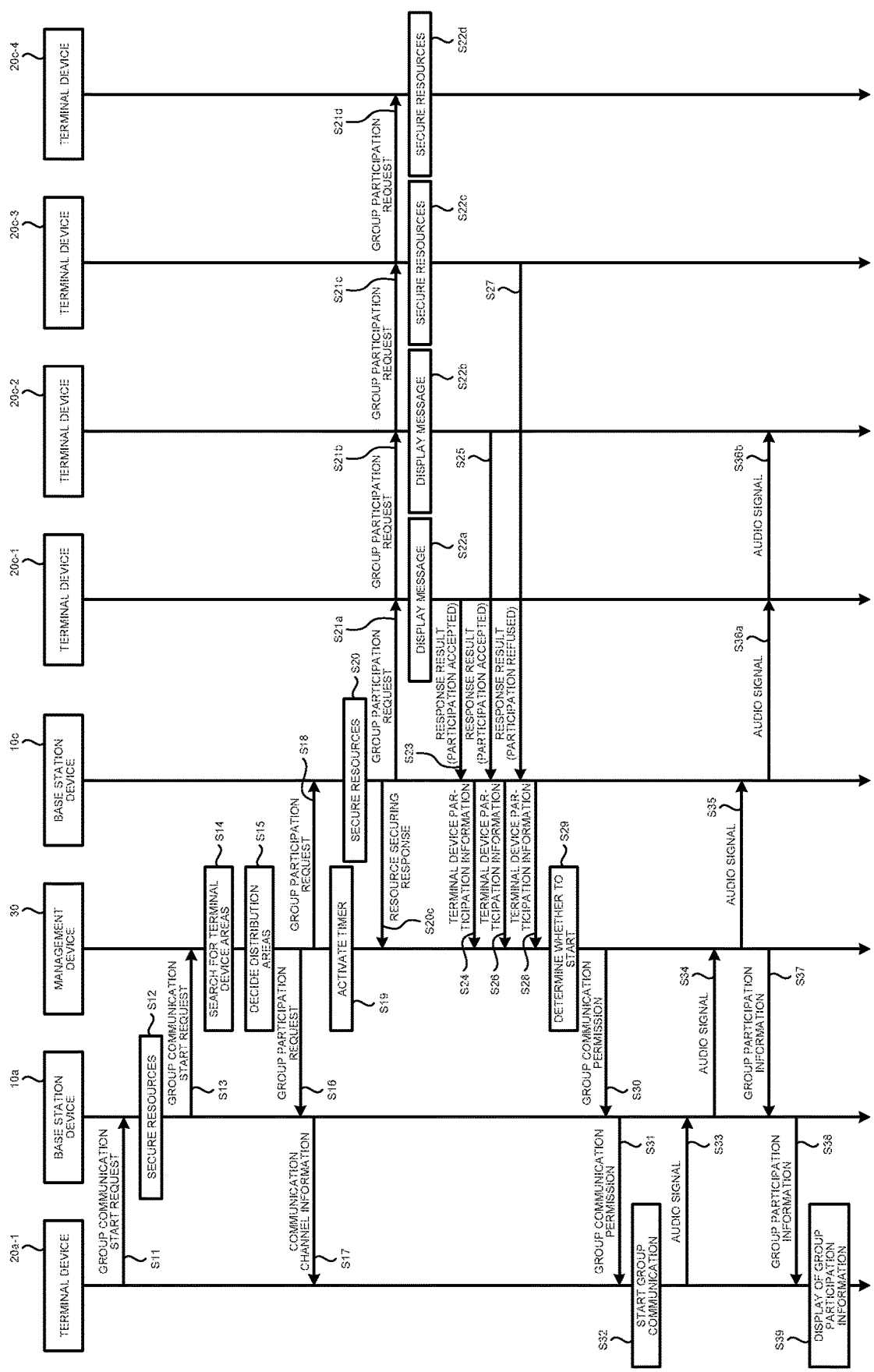
FIG. 7 is a sequence diagram illustrating an example of a process flow in respective devices in group communication according to this embodiment of the present invention.

With reference to FIG. 7, an explanation will be given of a process in group communication according to this embodiment of the present invention. FIG. 7 is a sequence diagram illustrating an example of a process flow in respective devices in group communication according to this embodiment of the present invention. Specifically, FIG. 7 illustrates a process in which, when a terminal device receives a calling for group communication, the user performs predetermined operations to answer whether to accept participation in the group communication, and to transmit this information from the terminal device to the base station device.

In FIG. 7, the terminal device 20*a*-1 serving as a call-origination terminal is registered in the base station device 10*a*, and the four terminal devices, which are the terminal device 20*c*-1 to the terminal device 20*c*-4, are registered in the base station device 10*c*. For the sake of brevity of description, the other base station devices and terminal devices are omitted from the illustration.

First, the terminal device 20*a*-1 transmits a group communication start request through an uplink control channel (step S11).

Upon reception of the group communication start request from the terminal device 20*a*-1, the base station device 10*a* secures resources (a communication channel and so forth) (step S12). When the base station device 10*a* has secured resources, the base station device 10*a* transmits the group communication start request to the management device 30 (step S13).

The management device 30 searches for each area where a terminal device waiting for the group communication is present (step S14). On the basis of the search result in step S14, the management device 30 decides distribution areas (step S15). Here, the management device 30 decides to transmit a group participation request to the base station device 10*a* and the base station device 10*c*.

The management device 30 transmits the group participation request to the base station device 10*a* (step S16). This is a process for transmitting the group participation request to a terminal device other than the terminal device 20*a*-1, when there is registration of this terminal device in the base station device 10*a*. The base station device 10*a* transmits communication channel information to the terminal device 20*a*-1 (step S17).

The management device 30 transmits the group participation request to the base station device 10*c* (step S18). At this time, the management device 30 activates a timer for determining whether to start the group communication (step S19). The waiting time of this timer may be set to a predetermined time (for example, 20 seconds) decided in advance, may be set by either one of the (First Method) to the (Fifth Method) described above, or may be set by the user of the terminal device 20 as described later.

Upon reception of the group participation request, the base station device 10*c* secures resources (a communication channel and so forth) (step S20). The base station device 10*c* transmits a resource securing response indicating whether the resources securing has succeeded, to the management device 30 (step S20*c*). The resource securing response is either one of resource securing (success) or resource securing (failure). The acquisition part 35 of the management device 30 acquires a resource securing response from each base station device 10 through the network IF part 31. Further, when the acquisition part 35 cannot acquire a resource securing response from a base station device 10 within a predetermined time after the group participation request is transmitted in step S16 or step S18, the acquisition part 35 determines that a fault occurred in the network associated with this base station device 10. In this case, it can also be said that the acquisition part 35 has acquired information on the network fault. Further, when the base station device 10*c* has secured resources, the base station device 10*c* transmits the group participation request to the terminal device 20*c*-1 to the terminal device 20*d*-4 (step S21*a*, step S21*b*, step S21*c*, and step S21*d*).

Upon reception of the group participation request, each of the terminal device 20*c*-1 to the terminal device 20*c*-4 displays a message on the display part (step S22*a*, step S22*b*, step S22*c*, and step S22*d*).

Figure 8:
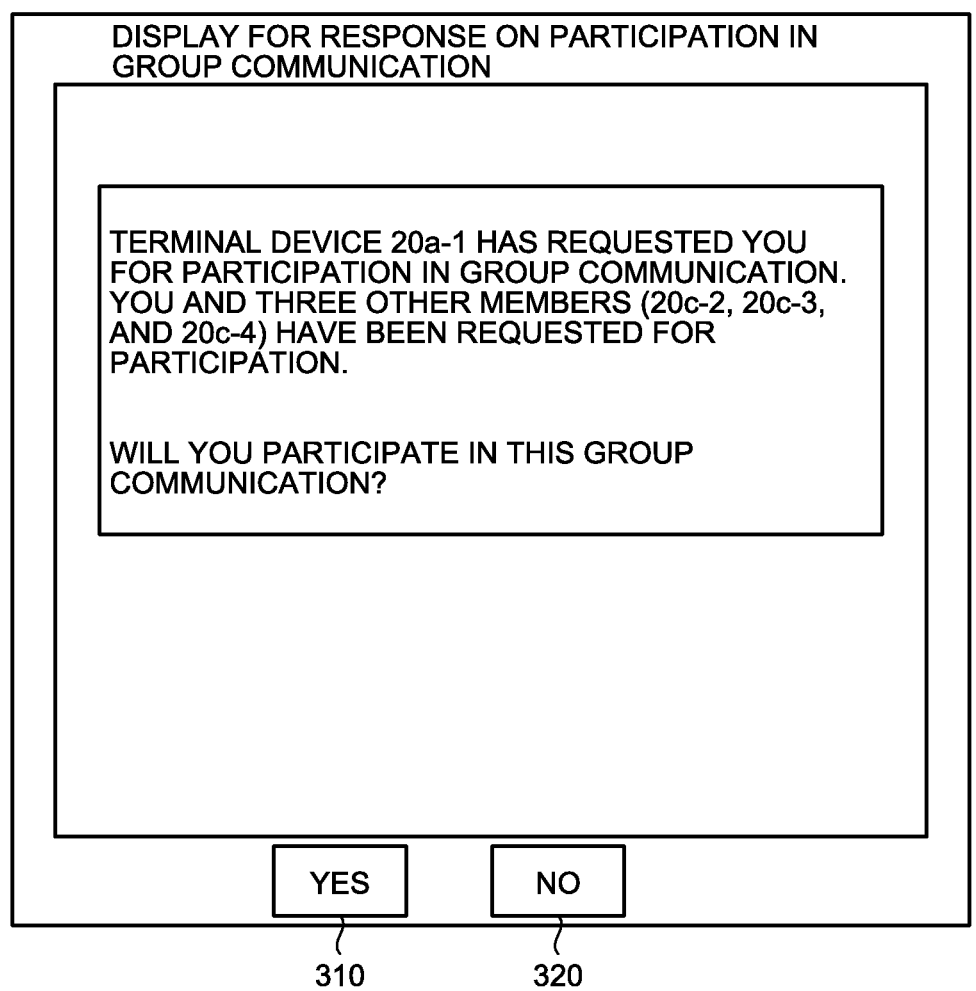
FIG. 8 is a diagram illustrating an example of a message displayed by a terminal device that has received a group participation request.

With reference to FIG. 8, an explanation will be given of a message displayed by each terminal device that has received the group participation request. FIG. 8 is a diagram illustrating an example of this message displayed by each terminal device that has received the group participation request. Here, FIG. 8 illustrates a message displayed by the terminal device 20*c*-1. As messages displayed by the terminal device 20*c*-2 to the terminal device 20*c*-4 are substantially the same as that of the terminal device 20*c*-1, the description thereof will be omitted.

The terminal device 20*c*-1 causes the display part to display a display surface 300. For example, the display surface 300 includes a message such that "Terminal device 20*a*-1 has requested you for participation in group communication. You and three other members (terminal device 20*c*-2, terminal device 20*c*-3, and terminal device 20*c*-4) have been requested for participation. Will you participate in this group communication?" Thus, the terminal device 20*c*-1 displays information on the terminal device that has requested participation in the group communication and on the terminal devices that have been requested for participation in the group communication. The user using the terminal device 20*c*-1 answers whether to accept participation in the group communication in accordance with the display surface 300. Specifically, the user presses a YES button 310 when accepting participation in the group communication, and presses a NO button 320 when not accepting participation. When the YES button 310 is pressed, the terminal device 20c-1 transmits a response result (participation accepted) indicating acceptance of participation in the group communication to the base station device 10c. When the NO button 320 is pressed, the terminal device 20c-1 transmits a response result (participation refused) indicating non-participation in the group communication to the base station device 10c. Here, the "response result (participation accepted)" may be referred to as "response result (permission)" or "response indicating acceptance of participation". Further, the "response result (participation refused)" may be referred to as "response result (non-participation)", "response result (non-permission)" or "response indicating non-participation".

With reference to FIG. 7, the terminal device 20c-1 transmits a response result (participation accepted) to the base station device 10c (step S23). The base station device 10c transmits terminal device participation information illustrating that the terminal device 20c-1 has accepted participation in the group communication, to the management device 30 (step S24). Here, in FIG. 7, the data to be transmitted from the terminal device 20 to the base station device 10 is shown as "response result", and the data to be transmitted from the base station device 10 to the management device 30 is shown as "terminal device participation information". However, these two pieces of data have substantially the same contents, and thus do not need distinction in terminology mutually. For example, the "terminal device participation information" may be referred to as "response result". The "terminal device participation information" will also be referred to as "response information". The acquisition part 35 of the management device 30 acquires response information from each base station device 10. This response information contains a response result transmitted from each terminal device 20.

The terminal device 20c-2 transmits a response result (participation accepted) to the base station device 10c (step S25). The base station device 10c transmits terminal device participation information indicating that the terminal device 20c-2 has accepted participation in the group communication, to the management device 30 (step S26).

The terminal device 20c-3 transmits a response result (participation refused) to the base station device 10c (step S27). The base station device 10c transmits terminal device participation information indicating that the terminal device 20c-3 has refused participation in the group communication, to the management device 30 (step S28).

After the timer activated in step S19 waits for just a period of a timer time (predetermined time), the communication control part 34 of the management device 30 determines whether to start the group communication, on the basis of terminal device participation information received during the period of the time (step S29). For example, when the number of terminal devices that have made a response of "participation accepted" is equal to or larger than a predetermined number, the communication control part 34 determines to start the group communication. On the other hand, when the number of terminal devices that have made a response of "participation accepted" is smaller than the predetermined number, the communication control part 34 determines not to permit (or to cancel) the group communication. Thus, only when the group communication participation information satisfies a predetermined condition, the group communication is started. When there is no reception of a response result from a certain terminal device within a predetermined time, this terminal device is determined as a terminal device with no response. In FIG. 7, as the terminal device 20c-4 did not transmit a participation response within a predetermined time, the terminal device 20c-4 is determined as a terminal device with no response. The management device 30 may treat a terminal device with no response in a way the same as or different from a terminal device that has refused participation. Further, the communication control part 34 may determine whether to start the group communication, on the basis of resource securing responses (success) acquired by the acquisition part 35 in step S20c. For example, when a predetermined number or more resource securing responses (success) are acquired, the communication control part 34 may decide to start the group communication. Alternatively, when the number of responses of "participation accepted" from terminal devices is equal to or larger than a predetermined number of α, and the number of resource securing responses (success) is equal to or larger than a predetermined number β, the communication control part 34 may decide to start the group communication. The resource securing response will also be referred to as "resource securing information".

The management device 30 sends notice of a determination result for the group communication to the base station device 10a (step S30). In step S30, the management device 30 sends notice of a determination result to start the group communication, to the base station device 10a. Here, in the example illustrated in FIG. 7, the notice sent from the management device 30 is "group communication permission", but may be "group communication non-permission (cancellation)" in some case. The base station device 10a sends notice of the determination result for the group communication (communication permission in FIG. 7) to the terminal device 20a-1 (step S31).

Upon reception of the group communication permission, the terminal device 20a-1 starts the group communication (step S32). In step S32, for example, a ringing tone previously output from the terminal device 20a-1 is stopped. Consequently, the user using the terminal device 20a-1 recognizes that this is a communicable state (utterable state).

When the terminal device 20a-1 comes in a state capable of starting communication, the terminal device 20a-1 transmits an audio signal to the base station device 10a (step S33). The base station device 10a transmits the audio signal received from the terminal device 20a-1 to the management device 30 (step S34). The management device 30 transmits the audio signal received from the base station device 10a to the base station device 10c (step S35).

The base station device 10c transmits the audio signal received from the management device 30 to the terminal device 20c-1 and the terminal device 20c-2 (step S36a and step S36b). In this way, the audio signal is distributed to the terminal devices that transmitted a response result (participation accepted) to the base station device 10c. On the other hand, the audio signal is not distributed to the terminal device 20c-3 that transmitted a response result (participation refused) and the terminal device 20c-4 that did not transmit a response result within a predetermined time.

When the terminal device 20a-1 receives the group communication non-permission (cancellation), a ringing tone previously output from the terminal device 20a-1 is stopped, and an error tone is output. In this case, for example, a message, such as "group communication non-permission (cancellation)", is displayed on the display surface of the terminal device 20a-1. Consequently, the user can recognize the cancellation of the group communication.

The management device 30 creates group participation information (communication result information). The acquisition part 35 refers to a second terminal database 332 of the storage part 33, and acquires all data related to the group ("group #1" in this case) serving as an object of the group communication. FIG. 9 is a diagram illustrating examples of the second terminal database 332 registered in the storage part 33. For example, in the example illustrated in FIG. 9, as the data related to the "group #1" is all data other than that of the terminal device ID "#20a-3", such all data is acquired. Thus, the acquisition part 35 acquires terminal device IDs, user IDs, base station IDs, and registration information, which correspond to the specific group, from the second terminal database 332 (storage part 33). As the data acquired by the acquisition part 35 from the storage part 33 contains information (registration information) indicating whether each terminal device 20 can receive, i.e., the state (operation information) of each terminal device 20 in the group communication, this data can be said to be terminal device operation information. The terminal device operation information will also be referred to as "terminal operation information", "terminal state information", or "terminal information". Here, the data stored in the second terminal database 332 is data (terminal device IDs, user IDs, group IDs, and base station IDs) acquired by the management device 30 from the base station devices 10, and data (registration state) created on the basis of data (base station device IDs) acquired by the management device 30 from the base station devices 10. Thus, it can also be said that the acquisition part 35 acquires, from the base station devices 10, terminal operation information necessary for creating group participation information. Then, on the basis of data acquired by the acquisition part 35 from the storage part, resource securing information acquired by the acquisition part 35, and response information acquired by the acquisition part 35, the processing part 32 creates group participation information. The group participation information includes information substantially the same as that in the participation information database 261 illustrated in FIG. 6. Thus, the group participation information (communication result information) includes terminal device IDs, user IDs, base station IDs, and participation information. However, the user IDs may be omitted.

The processing part 32 sets the contents (values) in the fields of "participation information" of the group participation information, as follows.

(1) A terminal device 20 which is "registered" in the data acquired by the acquisition part 35 from the second terminal device database 332 and from which the acquisition part 35 acquired a "response result (participation accepted)" is treated to set the participation information on this terminal as "participation accepted".

(2) A terminal device 20 which is "registered" in the data acquired by the acquisition part 35 from the second terminal device database 332 and from which the acquisition part 35 acquired a "response result (non-participation)" is treated to set the participation information on this terminal device 20 as "participation refused (non-participation)".

(3) A terminal device 20 which is "registered" in the data acquired by the acquisition part 35 from the second terminal device database 332 and from which the acquisition part 35 did not acquire a "response result" within a predetermined time is treated to set the participation information on this terminal device 20 as "no response".

(4) A terminal device 20 which is "unregistered" in the data acquired by the acquisition part 35 from the second terminal device database 332 is treated to set the participation information on this terminal device 20 as "power off". Further, when the management device 30 can recognize that a terminal device 20 is located in an area outside the communication service range during the group communication, the participation information on this terminal device 20 may be set as "out of range". Further, the "power off" and the "out of range" may be collectively set as "participation impossible" in the participation information. Thus, the participation information on each terminal device 20, which was in a reception impossible state during the group communication, may be set as "participation impossible".

(5) A terminal device 20 belonging to a base station device 10, from which the acquisition part 35 acquired a resource securing response (failure) by in step S20c, is treated to set the participation information on this terminal device 20 as "resource shortage".

(6) When the acquisition part 35 cannot acquire a resource securing response within a predetermined time in step S20c, there is a high possibility of a network fault between the base station device 10, which should originally transmit the resource securing response, and the management device 30. Accordingly, the participation information on a terminal device 20 belonging to this base station device 10 is set as "network fault".

Of these indications of the participation information, the "resource shortage" and the "network fault" are factors on the base station device 10 side, and the rest are factors on the terminal device 20 side. The factors on the base station 10 side are also referred to the factors related to the base station device 10. When a group participation request (data) is not transmitted from the base station device 10 to a terminal device 20, i.e., when there is a problem on the base station device 10, either one of two factors ("resource shortage" or "network fault") is set in the field of the participation information, as its factor. Further, as a factor on the terminal device 20 side, either one of four factors "participation accepted", "participation refused (non-participation)", "no response", and "power off" is set in the field of the participation information. Thus, when a terminal device 20 has not made participation in the group communication, either one of three factors "participation refused (non-participation)", "no response", and "power off" is set in the field of the participation information. The number of factors to be set when a terminal device 20 has not made participation in the group communication may be larger or smaller than the number described above. For example, the "power off" may be omitted to use two types of factors "participation refused (non-participation)" and "no response" for indication.

After the group communication is started, or after the group communication is finished, the group participation information is transmitted to the base station device 10a (step S37). The base station device 10a transmits the group participation information to the terminal device 20a-1 (step S38). The group participation information includes information on each terminal device that has accepted participation in the group communication and on its area, information on each terminal device that has refused the participation and on its area, information on each terminal device that made no response to the participation request and on its area, and information on an area in a state with resource shortage or network disconnection, together with collective information on terminal devices managed in this area. The terminal device 20a-1 displays the group participation information received from the management device 30 on an arbitrary display part (step S39). Then, the process of FIG. 7 ends.

Figure 10:
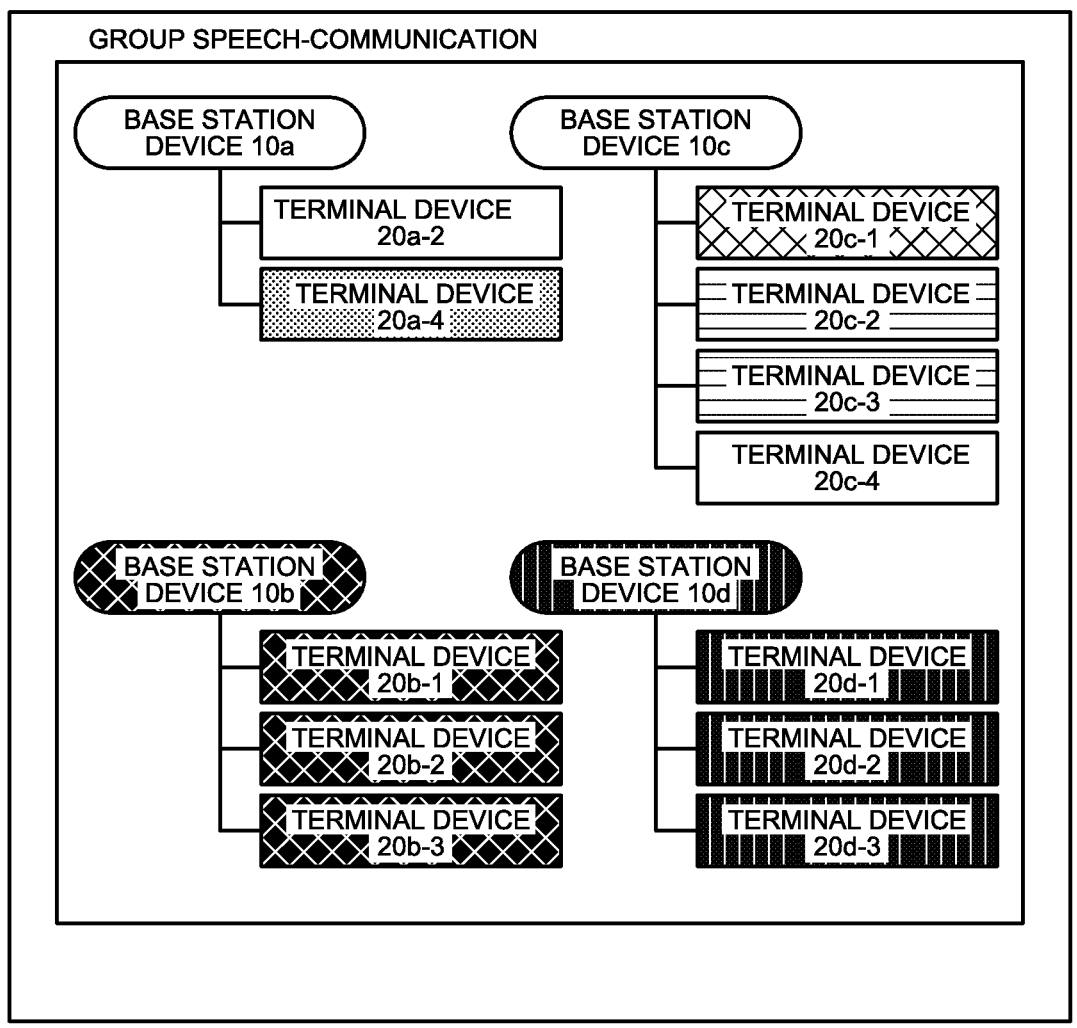
FIG. 10 is a diagram illustrating group participation information displayed on a display part.

With reference to FIG. 10, an explanation will be given of the group participation information displayed on the display part in step S39. FIG. 10 is a diagram illustrating the group participation information displayed on the display part.

FIG. 10 illustrates a display surface 400 displayed on the display part. The terminal device 20c-1 registered in the base station device 10*c* is displayed within a background of a faint cross pattern, which means that this terminal device is set as "participation refused". Each of the terminal device 20*c*-2 and the terminal device 20*c*-3 is displayed within a background of horizontal stripes, which means that this device is set as "no response". In this way, according to this embodiment, it is possible to report the distribution status of the group communication in more detail to the user.

Here, the timing at which the system management device transmits the group participation information to the terminal device through the base station device may be any timing after the start of the group communication. Thus, the group participation information may be transmitted while the group communication is ongoing, or may be transmitted after the group communication is finished.

For example, the management device 30 may transmit the group participation information to the base station device 10*a* simultaneously with the group communication permission in step S30. In this case, Step S37 may be omitted. However, where the group participation information is transmitted after the group communication is started, particularly, after the group communication is finished, it is possible to provide each terminal device with more detailed information. For example, in a case where a fault occurs in a base station device during the group communication and a terminal device registered in this base station device becomes incapable of receiving during the communication, such information can be included in the group participation information.

Here, in FIG. 7, the group participation information is provided only to the call-origination terminal device 20*a*-1, but this is not limiting. The group participation information may be provided to another terminal device that has accepted participation in the group communication. Alternatively, the group participation information may be provided also to a terminal device that has not made participation in the group communication. For example, after the group communication is finished, the management device 30 may send notice of the group participation information by mail or the like to the terminal devices associated with the group communication, which include terminal devices that have not made participation in the group communication. Further, the management device 30 may transmit the group participation information to a terminal device or another device, regardless of whether this device belongs to the group. For example, the management device 30 may transmit the group participation information to a terminal device (management terminal) used by a manager who manages the communication system.

Start Condition Setting Process

In the process described above, the management device 30 determines whether to start the group communication by using a condition decided in advance. However, the terminal device 20*a*-1 may set a start condition for the group communication. In this case, the management device 30 determines whether or not to start, in accordance with a condition set by the terminal device 20*a*-1. In other words, the terminal device 20*a*-1 sets a condition necessary for starting the group communication.

In a case where a start condition for the group communication is set, the start condition is included in the information of the group communication start request transmitted in step S11 of FIG. 7.

When starting the group communication, the terminal device 20*a*-1 asks the user to set information to be included in the information of the group communication start request. Consequently, the user can designate conditions for staring the group communication.

Figure 11:
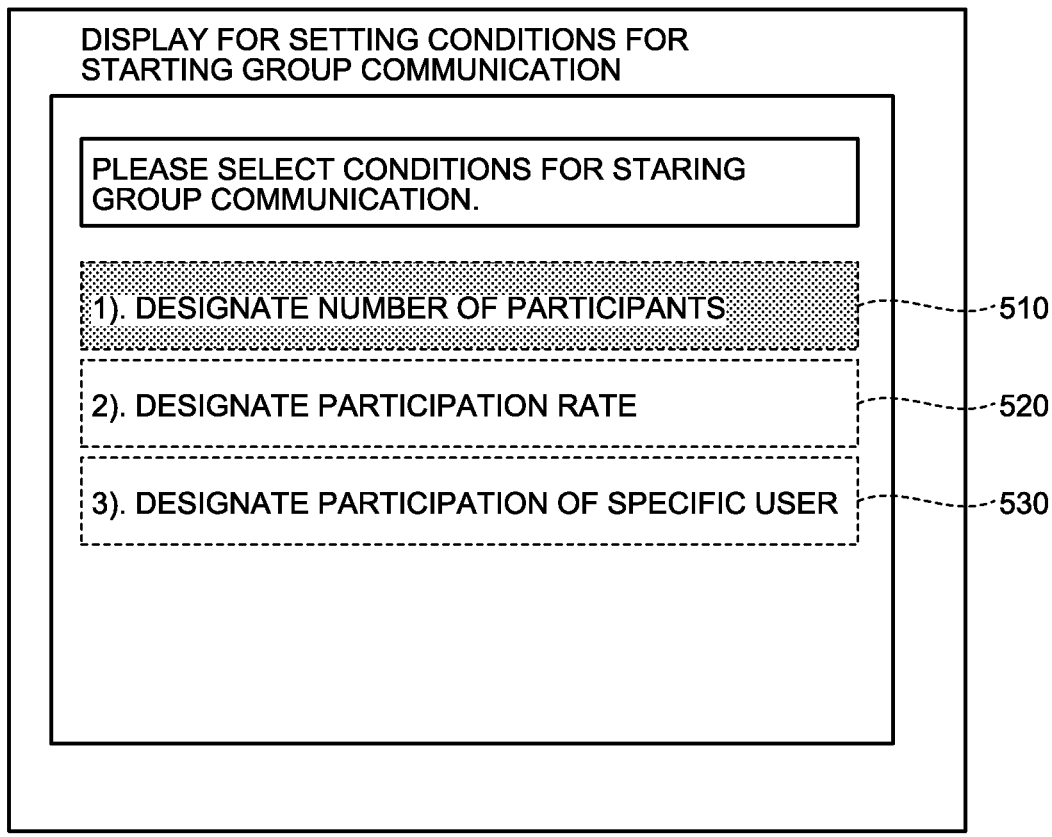
FIG. 11 is a diagram for explaining an example of a method of setting group communication.

With reference to FIG. 11, an explanation will be given of a method of setting conditions for starting group communication. FIG. 11 is a diagram for explaining an example of a method of setting group communication.

FIG. 11 illustrates a setting display 500 for setting conditions for starting group communication. For example, the setting display 500 is displayed with "Please select conditions for staring the group communication". The setting display 500 includes a number of participants selection field 510, a participation rate selection field 520, and a user selection field 530.

By selecting the number of participants selection field 510, the number of participants can be designated as a start condition for the group communication. By selecting the participation rate selection field 520, the past participation rate in group communication can be designated as a start condition for the group communication. By selecting the user selection field 530, participation of a specific user can be designated as a start condition for the group communication. For example, each of the fields can be selected by a touch panel provided on the display part or the operation part connected to the display part. Further, for each selection option, the user can designate a waiting time.

With reference to FIG. 12A, an explanation will be given of a method of setting the number of participants in the group communication as a condition for starting the group communication. FIG. 12A is a diagram for explaining an example of a method of setting the number of members in the group.

FIG. 12A illustrates a setting display 600A for setting the number of participants in the group communication. On the setting display 500 illustrated in FIG. 11, when the "number of participants" selection field 510 is selected, the setting display 500 is shifted to the setting display 600A. For example, the setting display 600A is displayed with "Please designate the number of participants in the group and the waiting time". The setting display 600A includes a number of participants designation field 610 and a waiting time designation field 620. The number of participants designation field 610 is a field for designating the number of participants in the group. Into the number of participants designation field 610, the number of participants may be directly input, or may be input by using buttons of up and down arrows included in the number of participants designation field 610. As the method for inputting a numerical value into each of the fields is substantially the same as that described above, the description thereof will be omitted below. The waiting time designation field 620 is a field for designating the waiting time.

When the number of participants is designated as "4" on the setting display 600A, the group communication is established when four or more users return a response result of "participation accepted". The call-origination terminal device 20 transmits a group communication start request including information on the number of participants and the waiting time. When responses of "participation accepted" are collected to be equal to or larger than the designated number of participants within the designated waiting time, the management device 30 sends notice of group communication permission.

With reference to FIG. 12B, an explanation will be given of a method of setting the participation rate in the group communication as a condition for starting the group communication. FIG. 12B is a diagram for explaining an example of a method of setting the participation rate.

FIG. 12B illustrates a setting display 600B for setting the participation rate in the group communication. On the setting display 500 illustrated in FIG. 11, when the participation rate selection field 520 is selected, the setting display 500 is shifted to the setting display 600B. For example, the setting display 600B is displayed with "Please designate the participation rate in the group and the waiting time". The setting display 600B includes a waiting time designation field 620 and a participation rate designation field 630. The participation rate designation field 630 is a field for designating the participation rate in the group.

The participation rate designation field 630 displays the average value of the past participation rates of the terminal devices 20 on the call-destination side, as an initial value of the participation rate. For example, where the past participation rates of five terminal devices 20 are "100%", "80%", "50%", "20%", and "0%", their average value "50%" is displayed as the initial value. The user can change the participation rate to an arbitrary value, with reference to the initial value. Here, the past participation rates may be participation rates related to the call-destination terminals, or may be participation rates related to all the terminal devices 20 for the group communication, which are the sum of the call-origination terminal and the call-destination terminals.

The terminal device 20 on the call-origination side transmits a group communication start request including information on the participation rate and the waiting time. When responses of "participation accepted" are collected to be equal to or higher than the designated participation rate within the designated waiting time, the management device 30 sends notice of group communication permission.

Figure 12C:
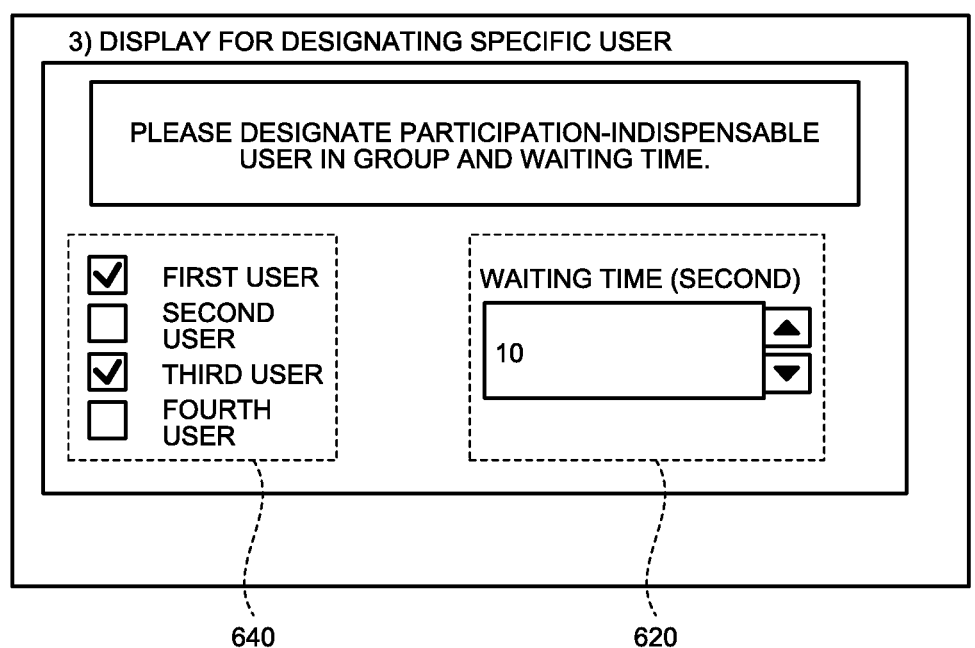
FIG. 12C is a diagram for explaining an example of a method of setting participation of a specific user as a condition for staring group communication.

With reference to FIG. 12C, an explanation will be given of a method of setting participation of a specific user as a condition for starting the group communication. FIG. 12C is a diagram for explaining an example of a method of setting participation of a specific user as a condition for staring the group communication.

FIG. 12C illustrates a setting display 600C for setting a user indispensable for the group communication. On the setting display 500 illustrated in FIG. 11, when the user selection field 530 is selected, the setting display 500 is shifted to the setting display 600C. For example, the setting display 600C is displayed with "Please designate a participation-indispensable user in the group and the waiting time". The setting display 600C includes a waiting time designation field 620 and a user designation field 640. The user designation field 640 is a field for designating a user whose participation in the group is indispensable.

In the user designation field 640, the user can select the name of a user or the name of a terminal device necessary for establishing the group communication, by an arbitrary number of one or more. The user designation field 640 is displayed with user names and check boxes, and users necessary for establishing the group communication can be designated by checking some of the check boxes. In the example illustrated in the setting display 600C, the user designation field 640 is displayed with a first user, a second user, a third user, and a fourth user, in which the first user and the third user are selected. In this case, if at least one of the first user and the third user do not make a response of "participation accepted" within the waiting time, the group communication is not established. The terminal device on the call-origination side transmits a group communication start request including information on the users whose participation in the group is indispensable, and the waiting time. When responses of "participation accepted" are collected from all the designated users within the designated waiting time, the system management device sends notice of group communication permission.

Figure 13:
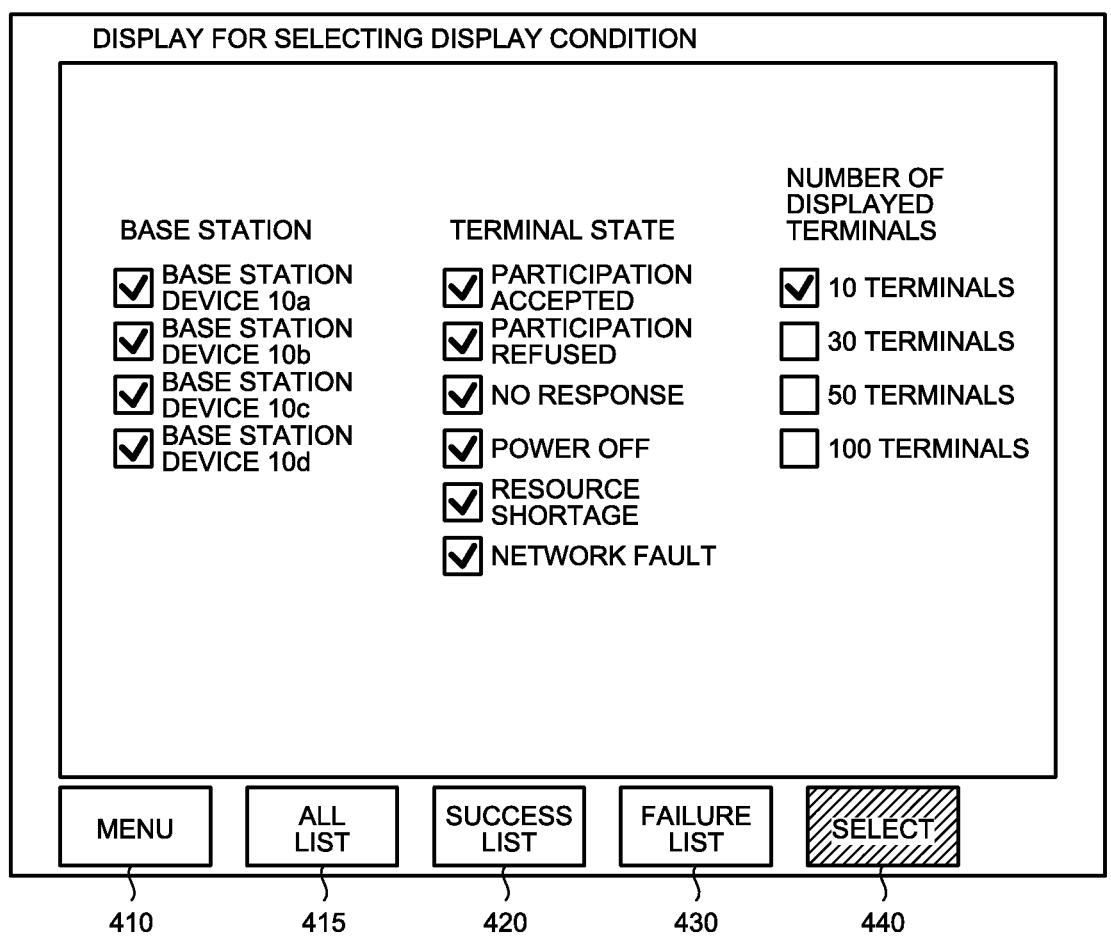
FIG. 13 is a diagram for explaining an example of a method of selecting display conditions for group participation information to be displayed on a display part.

With reference to FIG. 13, an explanation will be given of a method of selecting display conditions to be displayed on the display part. FIG. 13 is a diagram for explaining an example of a method of selecting display conditions for group participation information to be displayed on the display part. The display 600D contains a menu button 410 to display various setting menu of the terminal device 20.

FIG. 13 illustrates a display 600D for selecting display conditions to be displayed on the display part. For example, the user can select a "SELECT" button 440 to display the display 600D.

The display 600D shows display conditions to be displayed on the display part. For example, the display conditions are composed of a plurality of item sections. In the example illustrated in FIG. 13, the display condition are composed of three item sections (conditions), which is "base station" (condition on the base station), "terminal state" (condition on the terminal device for participating or non-participating in the group communication), and "number of displayed terminals" (condition on the number of terminals to be displayed). Hereinafter, an explanation will be given of these three item sections, but this is a mere example and does not limit the present invention. The display conditions may be composed of one or two item sections, or may be composed of a larger number of item sections.

The base station item section includes items of the base station device 10a, the base station device 10b, the base station device 10c, and the base station device 10d. The user can select at least one base station device to be displayed for the group participation information, from the base station device 10a, the base station device 10b, the base station device 10c, and the base station device 10d. Thus, it is possible to select a plurality of base station devices. For example, among the base station items, the user can select base station devices to be displayed by checking some of the check boxes. For example, when only the base station device 10a is selected, only the group participation information on the terminal devices 20 that uses the base station device 10a is displayed. Here, in the default state, all the base station devices 10 may be selected.

The terminal state item section includes items of "participation accepted", "participation refused", "no response", "power off", "resource shortage", and "network fault". Here, the "participation refused" indicates that participation in the group communication has been explicitly refused by the user's operation. The "no response" indicates that there was no participation response transmitted. The "power off" indicates that the power of the terminal device was in an off-state and thus the terminal device was incapable of participation. The "resource shortage" indicates that the base station device was short of resources and thus the terminal device was incapable of participation. The "network fault" indicates that there was a fault in the network NW connected to the base station device and thus the terminal device was incapable of participation. From these items (options), the user can select at least one terminal state to be displayed for the group participation information. Thus, it is possible to select a plurality of terminal states. For example, from the terminal state items, the user can select items to be displayed by checking some of the check boxes. For example, when only the "participation accepted" is selected, only the terminal devices that have accepted participation in the group communication are displayed.

The "number of displayed terminals" item section includes items of "10 terminals", "30 terminals", "50 terminals", and "100 terminals". In the "number of displayed terminals" item section, the number of terminal devices to be displayed at once on the display part 24 can be selected. The user can select one of these items (options). For example, from these items, the user can select an item to be displayed by checking the corresponding one of the check boxes. For example, when the "10 terminals" is selected, the number of terminal devices displayed at once becomes ten. In this case, the processing part 25 may display all the terminals when detecting operations of scrolling or switching screen pages by a user. By performing such a display, it is possible to prevent the information displayed on one face of the display from being unnecessarily large and making the display too complicated. Consequently, the user can easily grasp the distribution status and/or the participation status related to the group communication.

Here, as a method of limiting the number of terminals to be displayed, the following method may be used. For example, the priority of the terminal devices is stored in advance in association with the terminal device IDs in the first terminal device database 331 or the second terminal device database 332 stored in the storage part 33. For example, as the priority, numerical values of "1" to "10" are used such that a larger numerical value indicates a higher priority terminal device. For example, the priority of a terminal device used by an important user, such as a group responsible person or manager, is set to a high value, such as "10". Then, the user can select a condition for the priority of the terminal devices on a face of the display for selecting display conditions similar to the display 600D. For example, the user selects a condition such that "Display only terminal devices whose priority is 8 or more". Then, the group participation information is displayed for the terminal devices that match the condition selected by the user, while the display of the other terminal devices can be omitted. By performing such a display, it is possible to prevent the information displayed on a face of a display from being unnecessarily large and making display too complicated.

After setting the display conditions by using the display 600D, the user can select (press) either one of an "ALL LIST" button 415, a "SUCCESS LIST" button 420, and a "FAILURE LIST" button 430, to cause the display part 24 to display the group participation information in a desired format. For example, when the "All List" button 415 is selected, the display 400 illustrated in FIG. 10 is displayed. The information displayed at this time reflects the display conditions set by the display 600D.

As described above, according to this embodiment, it is possible to send notice of the distribution status of the group communication in detail to the user. As a result, the user can suitably grasp the communication status of each of the base station devices and the terminal devices.

Further, in this embodiment, an explanation has been given of a communication system for performing group communication that transmits and receives audio data, as an example of group communication. However, the group communication is not limited to this, but may be group communication that transmits and receives data of a text, image, video, or the like. For example, this may be applied to group communication, such as chatting, that exchanges text messages among three or more terminal devices.

Further, an explanation has been given of a business-use radio system as an example. However, the system is not limited to this, but may be another communication system. For example, this may be applied to group communication using a mobile phone network. The terminal device may be a mobile phone, smart phone, tablet terminal, computer (personal computer), or the like. Further, the terminal device does not necessarily need to be portable by users, or may not be movable. For example, the terminal device may be a computer of a desktop type.

According to the present invention, it is possible to provide detailed information on the communication status of group communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management device comprising:
an acquirer configured to acquire response information indicating whether a call-destination terminal has accepted participation in group communication, and terminal operation information indicating whether the call-destination terminal is in a state capable of receiving the group communication;
a processor configured to create communication result information including participation information on the call-destination terminal whether to participate in the group communication, on a basis of the response information and the terminal operation information acquired by the acquirer; and
a transmitter configured to transmit the communication result information,
wherein, in a case of non-participation where the call-destination terminal has not participated in the group communication, the processor is configured to create the participation information that makes it possible to identify at least two factors of the non-participation, one factor resulting from that the acquirer has acquired the response information indicating the non-participation in the group communication from the call-destination terminal, another factor resulting from that the acquirer did not acquire a response result from the call-destination terminal within a predetermined time.

2. The management device according to claim 1, wherein the acquirer is configured to acquire a start request for the group communication transmitted from a call-origination terminal,
further comprising a communication controller configure to execute the group communication when the acquirer acquires a predetermined number or more of the response information indicating participation accepted within a predetermined time, and configured not to execute the group communication when the acquirer does not acquire the predetermined number or more of the response information indicating the participation accepted within the predetermined time.

3. The management device according to claim 2, wherein the communication controller is configured to set either or both of the predetermined number and the predetermined time, on a basis of past response information on the call-destination terminal.

4. The management device according to claim 2, wherein the acquirer is configured to acquire the start request for the group communication that includes a condition for executing the group communication designated by the call-origination terminal, and the communication controller is configured to set either or both of the predetermined number and the predetermined time, on a basis of the condition.

5. The management device according to claim 1, wherein the processor is configured to create the participation information that makes it possible to identify the following states, the first state being that the acquirer has acquired the response information indicating the participation accepted in the group communication from the call-destination terminal, the second state being that the acquirer has acquired the response information indicating the non-participation in the group communication from the call-destination terminal, the third state being that the acquirer did not acquire the response result from the call-destination terminal within the predetermined time, the fourth state being that a start request for the group communication has not be transmitted to the call-destination terminal due to a factor on a base station device side.

6. A terminal device comprising:
a transmitter configured to transmit a start request for group communication that designates a call-destination terminal;
a receiver configured to receive communication result information including terminal device identification information that makes it possible to identify the call-destination terminal and participation information on the call-destination terminal whether to participate in the group communication in accordance with the start request; and
a processor configured to create a diagram illustrating at least whether the call-destination terminal has participated in the group communication, on a basis of the communication result information received by the receiver, and
a display configured to display the diagram;
wherein, in a case of non-participation where the call-destination terminal has not participated in the group communication, the participation information makes it possible to identify at least two factors of the non-participation, one factor resulting from that the participation in the group communication was refused by the call-destination terminal, another factor resulting from that a response result was not returned from the call-destination terminal within a predetermined time, and
wherein the processor is configured to cause the display to display the diagram illustrating the terminal device identification information of the call-destination terminal that has not participated in the group communication for each factor in a different display mode.

7. The terminal device according to claim 6, wherein the transmitter is configured to transmit the start request including a condition designating a number of terminals to be participated in the group communication necessary for executing the group communication.

8. The terminal device according to claim 6, further comprising an operation part that is configured to allow a user of the terminal device to select one or more of factors of the non-participation out of two or more thereof,
wherein the processor is configured to cause the display to display the diagram illustrating the terminal device identification information of the call-destination terminal that has not participated in the group communication due to the factor selected by the operation part.

9. The terminal device according to claim 6, wherein the participation information includes operation information on the base station to be used by the call-destination terminal, and wherein the processor is configured to cause the display to display the diagram illustrating the participation information on the call-destination terminal whether to participate in the group communication and the operation information on the base station in association with one another.

10. A non-transitory computer-readable recording medium that stores a program that causes a computer to execute a process comprising:
transmitting a start request for group communication designating a call-destination terminal;
receiving communication result information including terminal device identification information that makes it possible to identify the call-destination terminal in response to the start request and participation information on the call-destination terminal device whether to participate in the group communication;
based on the communication result information received in the receiving process, creating a diagram illustrating at least whether the call-destination terminal has participated in the group communication; and
displaying the diagram,
wherein, in a case of non-participation where the call-destination terminal has not participated in the group communication, the participation information makes it possible to identify at least two factors of the non-participation, one factor resulting from that the participation in the group communication was refused by the call-destination terminal, another factor resulting from that a response result was not be returned from the call-destination terminal within a predetermined time, and wherein the diagram illustrating the terminal device identification information of the call-destination terminal that has not participated in the group communication is displayed for each factor in a different display mode.

* * * * *